US012591294B1

(12) United States Patent
Kota et al.

(10) Patent No.: US 12,591,294 B1
(45) Date of Patent: Mar. 31, 2026

(54) PERFORMANCE STATES IN INTEGRATED CIRCUIT

(71) Applicant: Apple Inc., Cupertino, CA (US)

(72) Inventors: Rajesh Kota, Austin, TX (US); John H. Kelm, Belmont, CA (US); Josh P. de Cesare, Los Gatos, CA (US); Qing He, San Jose, CA (US); Rohit K. Gupta, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/633,105

(22) Filed: Apr. 11, 2024

Related U.S. Application Data

(60) Provisional application No. 63/586,167, filed on Sep. 28, 2023.

(51) Int. Cl.
| | |
|---|---|
| *G06F 1/32* | (2019.01) |
| *G06F 1/3234* | (2019.01) |
| *G06F 1/3287* | (2019.01) |

(52) U.S. Cl.
CPC .......... *G06F 1/3275* (2013.01); *G06F 1/3287* (2013.01)

(58) Field of Classification Search
CPC ............................. G06F 1/3275; G06F 1/3287
See application file for complete search history.

(56) References Cited

U.S. PATENT DOCUMENTS

| | | | | |
|---|---|---|---|---|
| 11,500,448 | B2 | 11/2022 | Rachakonda et al. | |
| 11,599,471 | B2 | 3/2023 | Chamarty et al. | |
| 2006/0005053 | A1* | 1/2006 | Jones | ......... G06F 12/0804 |
| | | | | 711/E12.04 |
| 2009/0024799 | A1* | 1/2009 | Jahagirdar | ......... G06F 1/3287 |
| | | | | 711/E12.052 |
| 2010/0185821 | A1* | 7/2010 | Paver | ......... G06F 12/0831 |
| | | | | 711/146 |
| 2015/0362980 | A1 | 12/2015 | Tripathi | |

* cited by examiner

*Primary Examiner* — Stefan Stoynov
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to reduced performance states in an integrated circuit. While in a first performance state, the integrated circuit powers components of the integrated circuit that access data from a memory via a memory controller that stores the data in a memory cache. The integrated circuit can transition to a second performance state in which the memory cache and a particular component of the components remain powered on while the remaining components are powered off and the memory is in a self-refresh mode. During the second performance state, the particular component can access data from a local memory and the memory cache. The integrated circuit can transition to a third performance state in which the memory is in the self-refresh mode, the memory cache is in a retention mode, and the particular component can access data from the local memory but not the memory cache.

20 Claims, 13 Drawing Sheets

*100*

700

Determining to Transition Integrated Circuit to First
Performance State From Higher Performance State
710

Transitioning Integrated Circuit to First Performance
State in Which Memory is in Self-Refresh Mode,
Particular Component Circuit And Memory Cache
Receive Power, And Particular Component Circuit
Accesses Data From Local Memory And Memory
Cache
720

Transitioning Integrated Circuit to Second Performance
State in Which Memory is in Self-Refresh Mode,
Memory Cache is in Retention Mode, And Particular
Component Circuit Accesses Data From Local Memory
730

FIG. 7

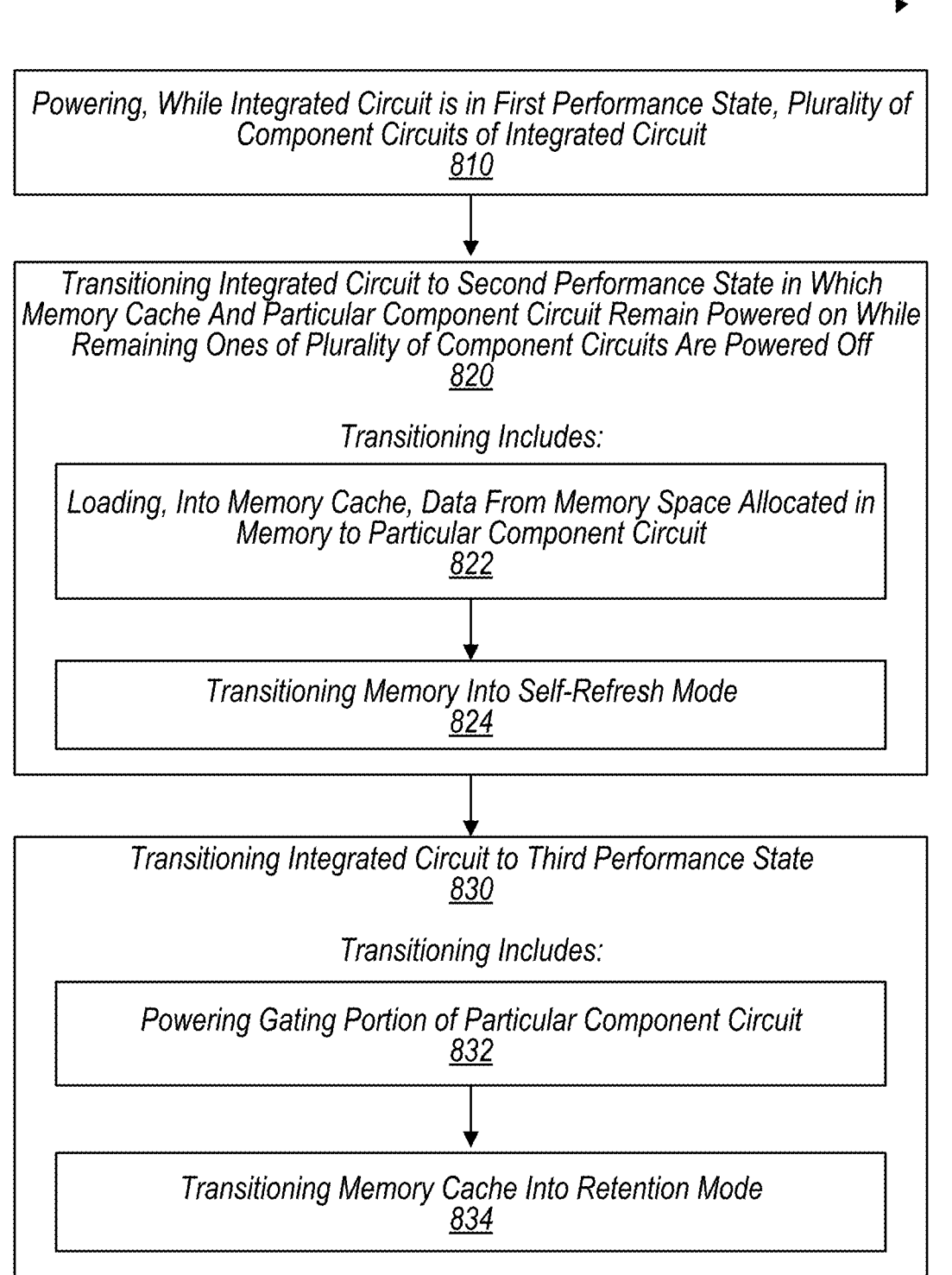

*800*

Powering, While Integrated Circuit is in First Performance State, Plurality of Component Circuits of Integrated Circuit
810

Transitioning Integrated Circuit to Second Performance State in Which Memory Cache And Particular Component Circuit Remain Powered on While Remaining Ones of Plurality of Component Circuits Are Powered Off
820

Transitioning Includes:

Loading, Into Memory Cache, Data From Memory Space Allocated in Memory to Particular Component Circuit
822

Transitioning Memory Into Self-Refresh Mode
824

Transitioning Integrated Circuit to Third Performance State
830

Transitioning Includes:

Powering Gating Portion of Particular Component Circuit
832

Transitioning Memory Cache Into Retention Mode
834

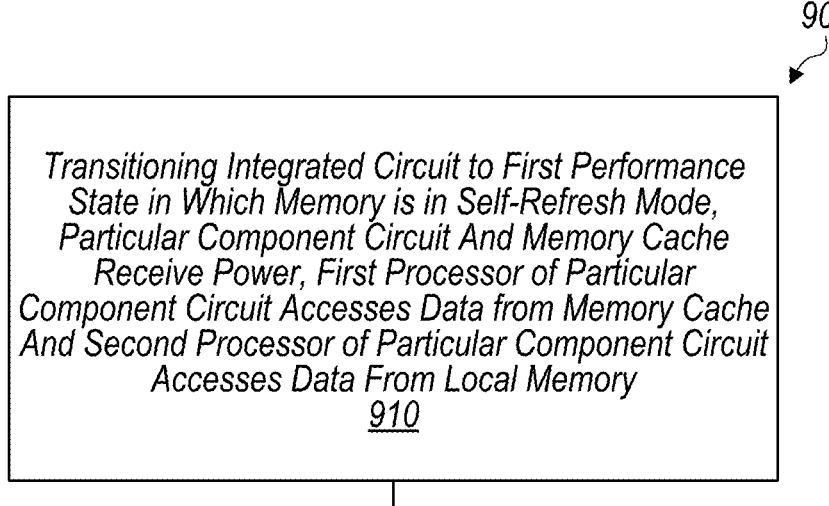

*Transitioning Integrated Circuit to First Performance State in Which Memory is in Self-Refresh Mode, Particular Component Circuit And Memory Cache Receive Power, First Processor of Particular Component Circuit Accesses Data from Memory Cache And Second Processor of Particular Component Circuit Accesses Data From Local Memory*
910

*Transitioning Integrated Circuit to Second Performance State in Which Memory Cache is in Retention Mode, First Processor is Power Gated, And Second Processor Accesses Data From Local Memory*
920

*FIG. 9*

PERFORMANCE STATES IN INTEGRATED CIRCUIT

PRIORITY CLAIM

The present application claims priority to U.S. Provisional Appl. No. 63/586,167, filed Sep. 28, 2023, the disclosure of which is hereby incorporated by reference herein in its entirety. To the extent that the incorporated material conflicts with the material expressly set forth herein, the expressly set forth material controls.

BACKGROUND

Technical Field

This disclosure relates generally to integrated circuits and, more specifically, to various mechanisms to implement reduced performance states in an integrated circuit.

Description of the Related Art

Modern computer systems often include a system on a chip (SOC) that integrates many component circuits (e.g., a central processing unit (CPU), a graphics processing unit (GPU), etc.) onto an integrated circuit die. Those component circuits can be coupled to a power source that supplies power to them to facilitate their functionality. Mobile devices (e.g., cell phones, smart phones, tablet computers, laptops, wearable devices, etc.) are often operating on a limited power supply, such as a battery, as compared to an essentially unlimited power supply such as a wall plug. Users generally value mobile devices that operate for longer periods of time on a given amount of battery charge. Accordingly, mobile device designers focus on controlling the power consumption of circuitry in the mobile devices while providing performance levels that are expected by users.

BRIEF DESCRIPTION OF THE DRAWINGS

FIGS. 7-9 are flow diagrams illustrating example methods that relate to transitioning an SOC through different performance states, according to some embodiments.

DETAILED DESCRIPTION

Figure 1A:
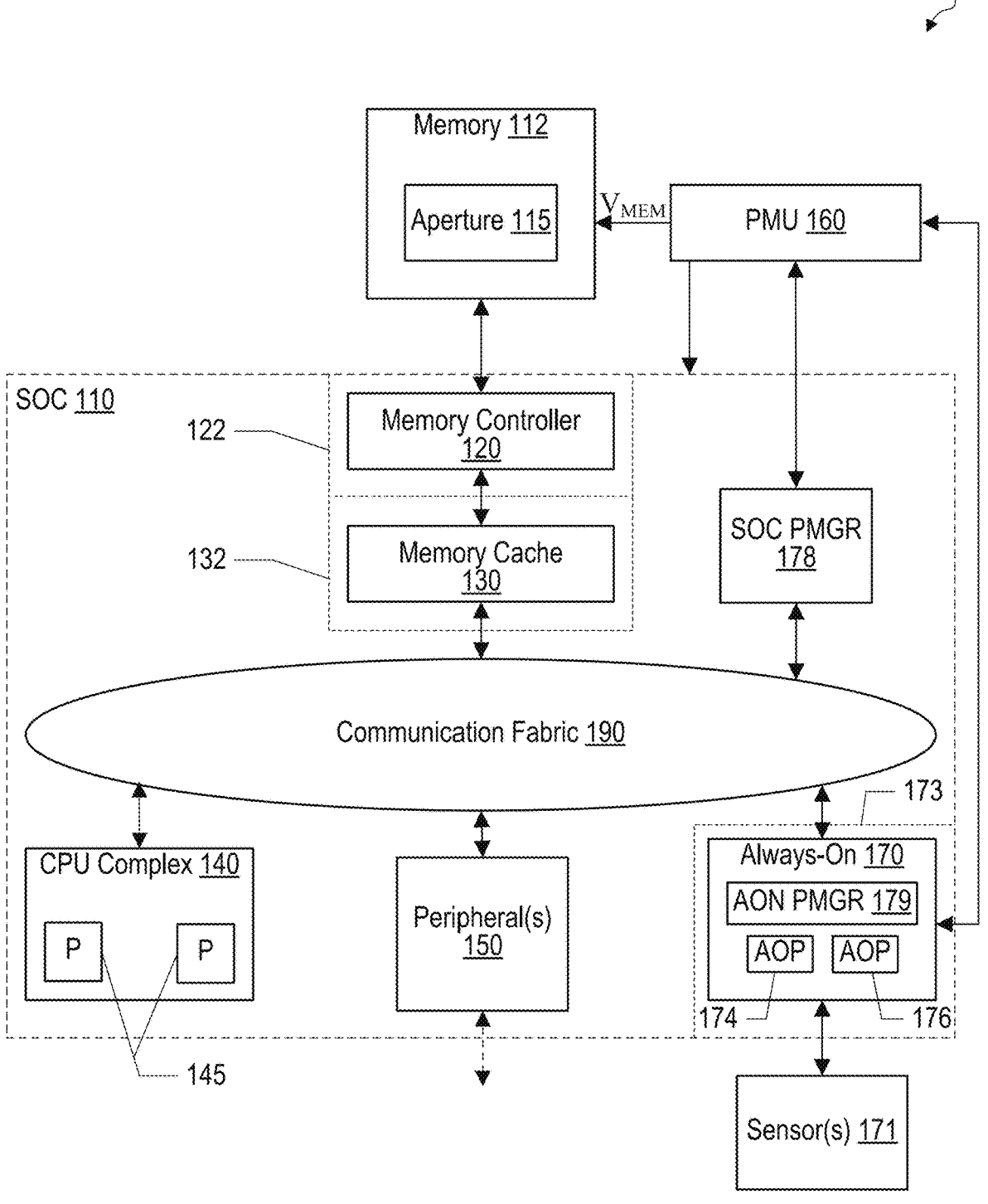
FIGS. 1A and 1B are block diagrams illustrating elements of an SOC, according to some embodiments.

To control power consumption, systems often include a power management circuit that provides various power-related functions (e.g., battery charging, power-rail management, and voltage conversion and regulation) to control the power provided to the components, such as a CPU, of those systems. In many cases, the power management circuit can transition its system through different performance states (also referred to as "power states") in which components of the system are powered up, powered down, power gated, etc. For example, during an awake state, all power domains of the system may be powered up, and each component of that system is operable. In another performance state, all components may be powered down except for an always-on component (AON component). As used herein, the term "always-on" in the context of a component refers to the fact that the component is powered on as long as the system having that component is receiving power. Thus, the always-on component is "always-on" in the sense that it is powered when its system is receiving any power (e.g., at times when that system is in standby mode or is operating actively) but is not powered when the system is not receiving any power (e.g., during times when the system is completely turned off). The AON component can include a processor (AOP) that continues to operate during that performance state in which all components except the AON component are powered down. The AOP may execute algorithms stored in a local memory (e.g., static random-access memory (SRAM)) of the AON component to process inputs, such as sensory data from sensors, that are received while its system is in the aforementioned performance state.

But due to the size of the local memory, the algorithms executed by the AOP cannot be overly complex, as more complicated algorithms generally have a larger memory footprint and thus cannot be completely stored in the local memory. One approach to resolving this problem is to increase the size of that local memory. In the case of SRAM, adding a few megabytes can result in a significant amount of die space (e.g., over a millimeter of die space) being used for that increase. This adds significant costs to the production of a die, which is exacerbated when multiple millions of dies are produced for a product. Furthermore, it is also difficult to predict how much to increase the size of the SRAM as the actual needs may not be known until years after the decision is made. Over provisioning the SRAM that a product does not use also leads to a power cost. As such, this disclosure addresses, among other things, the problem of how to increase the memory storage available to a component, such as the AON component, in view of costs and power consumption concerns, as discussed above for example.

In various embodiments described below, a system comprises various components that are configured to access data from a memory (e.g., dynamic random access memory (DRAM)) of the system. The system further includes a memory controller that interfaces to that memory on behalf of the components and can store data accessed from the memory in a memory cache to service requests from the components. In various embodiments, the system includes a power management circuit that can transition the system between different performances states. In an awake state, the components of the system are powered and operable. The power management circuit can transition the system to a memory sleep state (a reduced performance state) in which the memory cache and a particular component, such as an AON component, of the components of the system remain powered on while the remaining components (e.g., CPU processors) are powered off and the memory is in a self-refresh mode. In various embodiments, the particular component comprises processor circuitry that is configured to access data from a local memory (e.g., a SRAM of the AON component) and the memory cache. Before placing the memory in the self-refresh mode, program instructions and data that may be used by the processor circuitry during the memory sleep state can be fetched from the memory and stored in the memory cache (in the same address space used by the processor circuitry when addressing the memory) that remains powered and accessible to the processor circuitry in the memory sleep state. The power management circuit can further transition the system into a cache sleep state (a further reduced performance state) in which the memory is in the self-refresh mode and the memory cache is placed in a retention mode in which it retains cached data but is not accessible to the processor circuitry of the particular component. The processor circuitry may be configured to access data from the local memory but not the memory cache during the cache sleep state. Also, in various embodiments, the processor circuitry is implemented as two or more processors. At least one of those processors may operate out of the memory cache during various performance states (including the memory sleep state) while another processor may operate out of a local SRAM as it may attend to latency sensitive operations.

These techniques may be advantageous as they provide a mechanism that increases the memory storage available to the AON component. In particular, the memory sleep state allows the AON component to operate out of an external memory cache during a reduced performance state of the system in which the other components can be powered down and the main memory (DRAM) placed in a self-refresh mode in order to reduce the power consumption of the system. That is, instead of the processor circuitry of the AON component operating out of only a local memory during a reduced performance state in which the rest of the system is powered down, the memory sleep state is provided in which a memory cache remains powered and accessible so that the processor circuitry of the AON component can operate out of the memory cache in addition to the local memory. As a result, the memory storage available to the AON component during a reduced performance state is increased, and thus the AON component can implement algorithms and programs that have larger memory footprint that could not be completely stored in the local memory. Moreover, by permitting the system to transition to the cache sleep cache, the system can save additional power when the AON component is not seeking to execute the algorithms and programs having a larger memory footprint. Further, these techniques can be advantageous over an approach in which the AON component uses the memory (e.g., DRAM) for everything and the memory is woken when the AON component needs to access it. Using only the memory and having to wake it can result in latency issues, especially in cases in which the processor circuitry of the AON component is executing latency sensitive operations. Thus, being able to execute out of a local SRAM and the memory can allow for the processor circuitry to execute latency sensitive operations while increasing the available storage accessible to that processor circuitry.

Figure 1B:
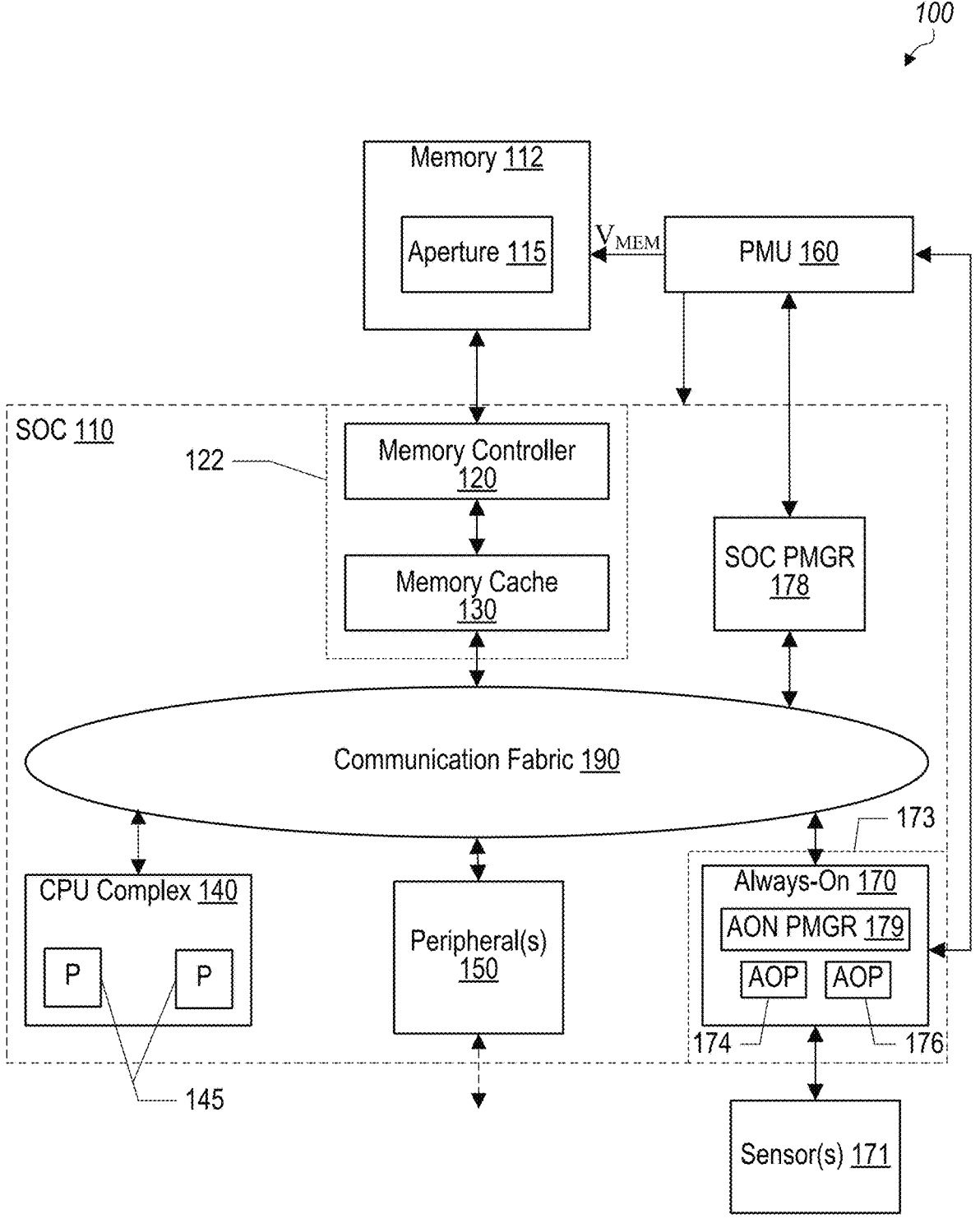

Turning now to FIG. 1A, a block diagram of one embodiment of a system 100 is shown. System 100 may be any type of hardware-based system, such as a desktop computer, a laptop computer, a tablet computer, a cellular or mobile phone, etc. Examples of different types of systems that can correspond to system 100 are discussed in more detail with respect to FIG. 11. In the illustrated embodiment, system 100 comprises an SOC 110 that is coupled to a memory 112, a power management unit (PMU) 160, and one or more sensors 171. Also as shown, SOC 110 includes a memory controller 120 (that is coupled to a memory cache 130), a CPU complex 140, one or more peripheral components 150 (briefly "peripherals"), an SOC power manager (SOC PMGR) 178, an always-on (AON) component 170, and a communication fabric 190 that couples components 130, 140, 150, 160, and 170 together. As further shown, AON component 170 comprises a AON PMGR 179, a first always-on processor (AOP) 174 and a second AOP 176. In some embodiments, system 100 is implemented differently than shown—e.g., memory controller 120 and memory cache 130 can be within the same power domain as shown in FIG. 1B and/or AON component 170 may comprise one AOP instead of multiple AOPs. It is noted that the number of components of system 100 (and/or the number of sub-components for those shown in FIG. 1) may vary between embodiments. Accordingly, there can be more or fewer of each component or subcomponent than the number shown in FIG. 1.

In FIG. 1, a dotted line separating a component in SOC 110 from the other components indicates an independent power domain. As such, dotted line 122 represents an independent power domain for memory controller 120, dotted line 132 represents an independent power domain for memory cache 130, and dotted line 173 represents an independent power domain for AON component 170. Other components and groups of components and/or subcomponents may have independent power domains as well. Generally, a power domain may be configured to receive a supply voltage (i.e. be powered on) or not receive a supply voltage (i.e. be powered off) independent of other power domains. Accordingly, since memory controller 120 is within a different power domain than memory cache 130, then memory controller 120 can be powered down without powering down memory cache 130. In some embodiments, power domains may be supplied with different supply voltage magnitudes concurrently The independence between power domains may be provided in a variety of fashions. For example, the independence may be provided by providing separate supply voltage inputs from PMU 160, by providing power switches between the supply voltage inputs and components and then controlling those power switches for a given domain as a unit, and/or a combination of the above. There may be more power domains than those depicted in FIG. 1 as well. For example, the CPU complex 140 may have an independent power domain (and/or each CPU processor 145 may have an independent power domain as well) in an embodiment. One or more peripheral 150 may be in one or more independent power domains in some embodiments.

Generally, a component can be referred to as powered on or powered off. A component, in various embodiments, is a predefined block of circuitry that provides a specified function in SOC 110 and has a specific interface to the rest of SOC 110. Accordingly, memory controller 120, CPU complex 140, peripherals 150, AON component 170, and SOC PMGR 178 are each an example of a component in those embodiments. A component is powered on if it is receiving a supply voltage so that it can operate as designed and powered off if it is not receiving that supply voltage and is not in operation. The component can also be referred to as powered up if it is powered on, and powered down if it is powered off. Powering up a component refers to supplying the supply voltage to a component that is powered off, and also, powering down a component refers to terminating the supply of the supply voltage to that component. Similarly, any subcomponent and/or SOC 110 as a whole can be referred to as powered up/down, etc.

Further, a component may be active if it is powered up and not clock gated. Thus, for example, a processor 145 in CPU complex 140 may be available for instruction execution if it is active. A component is inactive if it is powered off or in another low power state in which a significant delay may be experienced before the component can operate and interact with other components. For example, if the component requires a reset or a relock of a phase lock loop (PLL), it may be inactive even if it remains powered. A component is also inactive if it is clock gated. Clock gating a component refers to techniques in which the clock to the digital circuitry in that component is temporarily "turned off," preventing state from being captured from that digital circuitry in clocked storage devices such as flops, registers, etc.

SOC 110, in various embodiments, integrates various components (e.g., CPU complex 140, AON component 170, etc.) onto a single semiconductor substrate as an integrated circuit chip and hence is referred to as a system on a chip (SOC). In some embodiments, however, the components are implemented on two or more discrete chips that are coupled together in system 100. For the ease of discussion, various embodiments in this disclosure are described as being implemented using one or more SOCs. But it is to be understood that any disclosed SOC can also be implemented using a chiplet-based architecture. Wherever the term "SOC" appears in this disclosure, the references are intended to suggest alternate embodiments in which the same functionality is implemented via a less monolithic architecture such as using multiple dies that can be included in a single integrated assembly package in some embodiments.

Architectures in which there are multiple dies are to be understood to encompass both homogeneous designs (in which each die includes identical or almost identical functionality) and heterogeneous designs (in which the functionality of each die diverges more considerably). This disclosure further contemplates embodiments in which the functionality of multiple SoCs are implemented using different levels of discreteness. For example, the functionality of a first system could be implemented on a single IC, while the functionality of a second system (which could be the same or different than the first system) could be implemented using a number of co-packaged dies/chiplets.

Memory 112, in various embodiments, is usable to store data and program instructions that are executable by components of SOC 110 (e.g., CPU complex 140) to cause system 100 to implement operations as described herein. Memory 112 can be implemented using different physical memory media, such as hard disk storage, floppy disk storage, removable disk storage, flash memory, random access memory (RAM—SRAM, EDO RAM, SDRAM, DRAM, etc.), read only memory (PROM, EEPROM, etc.), etc. In various embodiments, memory 112 can be placed into a self-refresh mode in which memory 112 performs the periodic refreshes needed to retain data, which are normally performed by memory controller 120 when it is powered on. Memory 112 may be placed into the self-refresh mode during certain performance states (e.g., the performance states in which memory controller 120 is not powered), and while in the self-refresh mode, memory 112 may not be externally accessible until the mode is changed. The memory available to SOC 110 is not limited to primary storage, such as memory 112. Rather, SOC 110 can include other forms of storage such as memory cache 130 and/or cache memory (e.g., L1 cache, L2 cache, etc.) within components (e.g., CPU complex 140) of SOC 110.

Memory controller 120, in various embodiments, includes circuitry that is configured to receive, from the other components of SOC 110, memory requests (e.g., load/store requests, instruction fetch requests, etc.) to perform memory operations, and circuitry that is configured to access memory 112 to complete those memory operations. Memory controller 120 may be configured to access any type of memory 112. In some embodiments, memory controller 120 includes queues for memory operations, for ordering (and potentially reordering) the memory operations and presenting them to memory 112. Memory controller 120 may also include data buffers to store write data awaiting to be written to memory 112 and read data awaiting to be returned to the source of a memory operation, such as a processor 145 located in CPU complex 140. While a single memory controller 120 is shown, in some embodiments, there are multiple memory controllers 120 that are coupled to the same or different memory 112.

Memory cache 130, in various embodiments, includes a storage array that is configured to store recently accessed data that was accessed by memory controller 120 from memory 112. In SOC implementations, for example, memory cache 130 may reduce power consumption in SOC 110 by avoiding reaccess of data from memory 112 if it is expected to be accessed again soon. In various embodiments, memory cache 130 is referred to as a system cache, as opposed to private caches, such as an L2 cache or caches in processors (e.g., processors 145), that serve only certain components. As mentioned, in various embodiments, memory controller 120 can be powered down without powering down memory cache 130. Thus, SOC 110 may transition to performance state(s) in which memory controller 120 is powered down while memory cache 130 remains powered and accessible to components of SOC 110 that are also powered during those performance states. Thus, memory cache 130 may be used to permit data accessed from memory 112 to be available even when memory controller 120 is powered down and memory 112 is in the aforementioned self-refresh mode.

CPU complex 140, in various embodiments, includes a set of processors 145 that serve as a CPU of the SOC 110. Processors 145 may execute the main control software of the system, such as an operating system. Generally, software executed by the CPU during use controls the other components of the system to realize the desired functionality of the system. Processors 145 may further execute other software, such as application programs. An application program may provide user functionality and rely on the operating system for lower-level device control, scheduling, memory management, etc. Consequently, processors 145 can also be referred to as application processors. CPU complex 140 may include other hardware such as an L2 cache and/or an interface to the other components of the system (e.g., an interface to communication fabric 190).

A processor 145, in various embodiments, includes any circuitry and/or microcode that is configured to execute instructions defined in an instruction set architecture implemented by the processor 145. Processors 145 may encompass discrete microprocessors, processors and/or microprocessors integrated into multichip module implementations, processors implemented as multiple integrated circuits, etc. Processors 145 can fetch instructions and data from memory 112 as a part of executing load instructions and store the fetched instructions and data in caches of CPU complex 140. In various embodiments, processors 145 share a common last level cache (e.g., an L2 cache) while including their own caches (e.g., an L0 cache, an L1 cache, etc.) for storing instructions and data. Processors 145 can retrieve instructions and data (e.g., from the caches) and execute those instructions (e.g., conditional branch instructions, ALU instructions, etc.) to perform operations that involve the data. Processors 145 may then write a result of the operations back to memory 112.

Peripherals 150, in various embodiments, are sets of additional hardware functionality included in SOC 110. For example, peripherals 150 may include video peripherals such as an image signal processor configured to process image capture data from a camera or other image sensor, GPUs, video encoder/decoders, scalers, rotators, blenders, display controllers, etc. As other examples, peripherals 150 may include audio peripherals such as microphones, speakers, interfaces to microphones and speakers, audio processors, digital signal processors, mixers, etc. Peripherals 150 may include interface controllers for various interfaces external to SOC 110, such as Universal Serial Bus (USB), peripheral component interconnect (PCI) including PCI Express (PCIe), serial and parallel ports, etc. The interconnection to external devices is illustrated by the dashed arrow in FIG. 1 that extends external to SOC 110. Peripherals 150 may include networking peripherals such as media access controllers (MACs).

PMU 160, in various embodiments, includes circuitry configured to generate supply voltages and to provide those supply voltages to other components of system 100, such as SOC 110, memory 112 (VMEM in FIG. 1), and various off-chip peripheral components (not shown) such as display devices, image sensors, user interface devices, etc. PMU 160 may thus include programmable voltage regulators, logic to interface to SOC 110 (particularly AON PMGR 179 and SOC PMGR 178) and to receive voltage requests, etc. PMU 160 may generate and provide multiple supply voltages. As an example, there may be a supply voltage for CPU complex 140 and at least one supply voltage for the rest of SOC 110. There may be separate supply voltages for memory controller power domain 122, memory cache power domain 132, and always-on power domain 173, in addition to the supply voltage(s) supplied to other components of SOC 110, such as CPU complex 140. In some embodiments, the same supply voltage serves memory controller power domain 122, memory cache power domain 132, and always-on power domain 173, and the other components of SOC 110 and power gating may be employed based on those power domains. In some embodiments, there may also be a memory supply voltage for various memory arrays in CPU complex 140 and/or SOC 110. That supply voltage may be used with the voltage supplied to the logic circuitry, which may have a lower voltage magnitude than that required to ensure robust memory operation.

Always-on component 170, in various embodiments, comprises circuitry configured to remain powered on as long as SOC 110 receives power, even when other components of SOC 110 (e.g., memory controller 120, CPU complex 140, peripheral(s) 150, and SOC PMGR 178) are powered down. More particularly, AON component 170 remains powered whenever SOC 110 is receiving power from PMU 160. Thus, AON component 170 is "always-on" in the sense that it is powered if SOC 110 is receiving any power (e.g. at times when system 100 including SOC 110 is in standby mode or is operating actively), but is not powered when SOC 110 is not receiving any power (e.g. at times when system 100 is completely turned off). AON component 170 may support certain functions (e.g., sensor processing) while the remainder of SOC 110 is off, allowing low power operation.

As illustrated in FIG. 1, AON component 170 is coupled to at least one sensor 171 (and may be coupled to multiple sensors 171). AON component 170 may be configured to read the sensor data from sensors 171 while the rest of SOC 110 is powered off in addition to the times when all of SOC 110 is powered on. AON component 170 may include a local memory, such as an SRAM, to buffer received sensor data, and the rest of SOC 110 need not be powered up if asleep unless the local memory (or a portion thereof allocated to store the sensor data) fills with data (or reaches a threshold level of fullness).

Sensors 171 may be any devices that are configured to detect or measure aspects of the physical environment of system 100. For example, a sensor 171 may include an accelerometer that measures acceleration of system 100. That accelerometer may be directional (measuring acceleration in a predetermined direction) or vector-based (measuring acceleration in multiple dimensions and producing a vector that indicates the acceleration and its direction). Multiple directional accelerometers may be employed to permit vector acceleration sensing as well as directional acceleration sensing. Another example of a sensor 171 may be gyroscope (or gyro) that can be used to detect the orientation of system 100 and/or changes in orientation. Like the accelerometer, a gyroscope may be directional or multidimensional, and/or multiple directional gyroscopes may be used. Other examples of sensor 171 include a magnetometer (which may be used to measure magnetic orientation and thus may be used to form a compass), an audio detector (e.g. a microphone), a photodetector that detects light or other electromagnetic energy (e.g. an ambient light sensor), an altimeter, a temperature sensor, and a pressure sensor. Still another sensor 171 may be a user interface device such as a button, a touch screen, a keyboard, a pointing device, a camera, etc. As mentioned, AON component 170 may buffer sensor data from sensors 171 in a local memory of AON component 170. In various embodiments, AON component 170 is configured to process the sensor data in some fashion as well. In particular, AOP 174 and AOP 176 may be used to process that sensor data.

AOP 174 and AOP 176, in various embodiments, includes circuitry and/or microcode that is configured to execute instructions defined in an instruction set architecture implemented by those processors. AOP 174 may be coupled to a local memory (e.g., an SRAM) that is used to store data (e.g., sensor data from sensors 171) and instructions that may be executed by AOP 174. In particular, in various embodiments, AOP 174 is a processor configured to execute one or more applications that have low latency real time response guarantees and operate out of the local memory coupled to AOP 174. Those applications may process sensor data, e.g., to detect the occurrence of particular events, such as to detect a voice command issued by a user. Such applications may be always running background applications. In various embodiments, AOP 176 is a processor configured to execute one or more applications that operate out of memory 112 and memory cache 130. The applications executed by AOP 176 may have a larger memory footprint than those executed by AOP 174 that prevents the larger applications from being able to be stored within the local memory coupled to AOP 174. As an example, it may be desirable to execute a machine learning algorithm, but its implementation may be too large to fit into the local memory. As such, in various embodiments, AOP 176 is provided that can operate out of memory cache 130, which can have sufficient storage space to store the implementation of the machine learning algorithm.

In various embodiments, a contiguous memory space (illustrated as aperture 115 in FIG. 1A) is allocated to AOP 176—that is, aperture 115 can be fixed allocated memory space in the memory space of memory 112. Aperture 115 may be allocated during a boot sequence of SOC 110 and may store data and instructions for AOP 176. As such, while memory 112 is powered and accessible, AOP 176 may send requests to memory controller 120 to access and return the contents of aperture 115 from memory 112. As discussed in more detail with respect to FIG. 2, AON PMGR 179 may transition system 100 into a performance state in which memory 112 is in the self-refresh mode but memory cache 130 is powered and accessible to AOP 176. Before placing memory 112 into the self-refresh mode, the contents of aperture 115 may be stored in memory cache 130 so that AOP 176 can access that content during that performance state. By allowing AOP 176 to access its data and instructions from memory cache 130, system 100 may be transitioned to a relatively low performance state in which many components of system 100 are powered off or reduced to a low power state. As a result, system 100 may save power while allowing for larger applications to be executed in AON component 170.

In various embodiments, SOC 110 includes power management circuitry configured to generates SOC clocks, reset, and interrupts—the power management circuitry may control the supply voltage magnitudes that are requested from PMU 160. The power management circuitry may be under direct software control (e.g., software may directly request the power up and/or power down of components) and/or may be configured to monitor SOC 110 to determine when various components are to be powered up/powered down. In various embodiments, the power management circuitry is broken up into SOC PMGR 178 and AON PMGR 179. SOC PMGR 178, in various embodiments, is configured to manage a set of phase lock loops, voltage scaling mechanisms, rest control, and temperature sensor interfaces. SOC PMGR 178 may also include circuitry configured to orchestrate performance-related adjustments of components in system 100. Consider an example in which a frequency of memory 112 is to be adjusted, causing the memory to become unavailable while the adjustment is made. SOC PMGR 178 might ensure that certain components are prepared for that unavailability of memory 112. SOC PMGR 178 may be powered on during an awake state and a CPU sleep state but power off during a memory sleep state and a cache sleep state, which are discussed in greater detail with respect to FIG. 2. Also, as discussed in greater detail with respect to FIG. 3, SOC PMGR 178 may be configured to preload the contents of aperture 115 from memory 112 into memory cache 130 on behalf of AOP 176 before system 100 is transitioned into a performance state in which memory 112 is in the self-refresh mode.

AON PMGR 179, in various embodiments, includes circuitry configured to transition system 100 through various performance states. Since there may be one or more performance states in which SOC 110 is powered off except for AON component 170, AON PMGR 179 may reside within AON component 170 so that it can orchestrate power state transitions during those states. In order to perform power management, in various embodiments, AON PMGR 179 may implement hardcoded logic (e.g., state machines), circuitry that executes instructions (e.g., firmware or software instructions), or a combination of these. Accordingly, AON PMGR 179 may transition system 100 through various performance states in accordance with a state machine in response to particular events. A state machine that may be implemented by AON PMGR 179 is discussed in more detail with respect to FIG. 2.

Communication fabric 190, in various embodiments, is an interconnect that facilitates communication among the components of SOC 110. For example, communication fabric 190 can enable AOP 176 to send a memory request to memory controller 120 for data that is stored at memory 112 and subsequently receive the data. Communication fabric 190 may implement any type of communication interconnect and protocol for communicating among components coupled to fabric 190. For example, in some embodiments, communication fabric 190 is bus-based, including shared bus configurations, cross bar configurations, and hierarchical buses with bridges. Communication fabric 190 may be packet-based and hierarchical with bridges, cross bar, point-to-point, or other interconnects. In some embodiments, communication fabric 190 implements a ring topology in which its network switches form a ring so that any network switch may reach any other network switch in the ring by transmitting a communication on the ring in the direction of the other network switch. Communication fabric 190 may implement a double ring topology in which there are multiple communication paths (e.g., one path used to send requests in a clockwise direction among components of SOC 110 and another path that is used to send requests in a counterclockwise direction). The term "communication fabric" can be used interchangeably with the term "communication network."

Turning now to FIG. 1B, a block diagram of a different embodiment of a system 100 is shown. The illustrated system 100 of FIG. 1B is the same as the illustrated system 100 of FIG. 1A, except memory cache 130 is part of the same power domain 122 as memory controller 120 in FIG. 1B. In particular, in some embodiments, system 100 does not support the performance state in which memory cache 130 is accessible while memory 112 is not. Accordingly, in those embodiments, memory cache 130 can be part of the same power domain as memory controller 120 so that when memory controller 120 is powered off, memory cache 130 is powered off or placed in a retention mode. It may still be desirable for AON component 170 to execute certain applications having a larger memory footprint than can be stored in the local memory of AON component 170. Thus, as shown in FIG. 1B, AON component 170 can include AOP 176, which may operate out of memory 112 and memory cache 130; however, AOP 176 may not operate out of memory cache 130 when memory 112 is placed into the self-refresh mode.

Further, while AON component 170 is shown with two processors, AOP 174 and AOP 176, in some embodiments, AON component 170 comprises a processor having circuitry that implements the combined functionality of AOP 174 and AOP 176. Accordingly, that processor may operate out of the local memory (which may store sensor data), memory cache 130, and memory 112. As such, the processor may be used to execute small applications out of the local memory and larger applications out of memory 112 and memory cache 130. Also, whether that processor can operate out of memory 112 and memory cache 130 may be determined based on the current performance state of system 100. For example, during a memory sleep state (which is discussed in greater detail with respect to FIG. 2), the processor may operate out of memory cache 130 but not memory 112 as memory 112 may be in the self-refresh mode.

Figure 2:
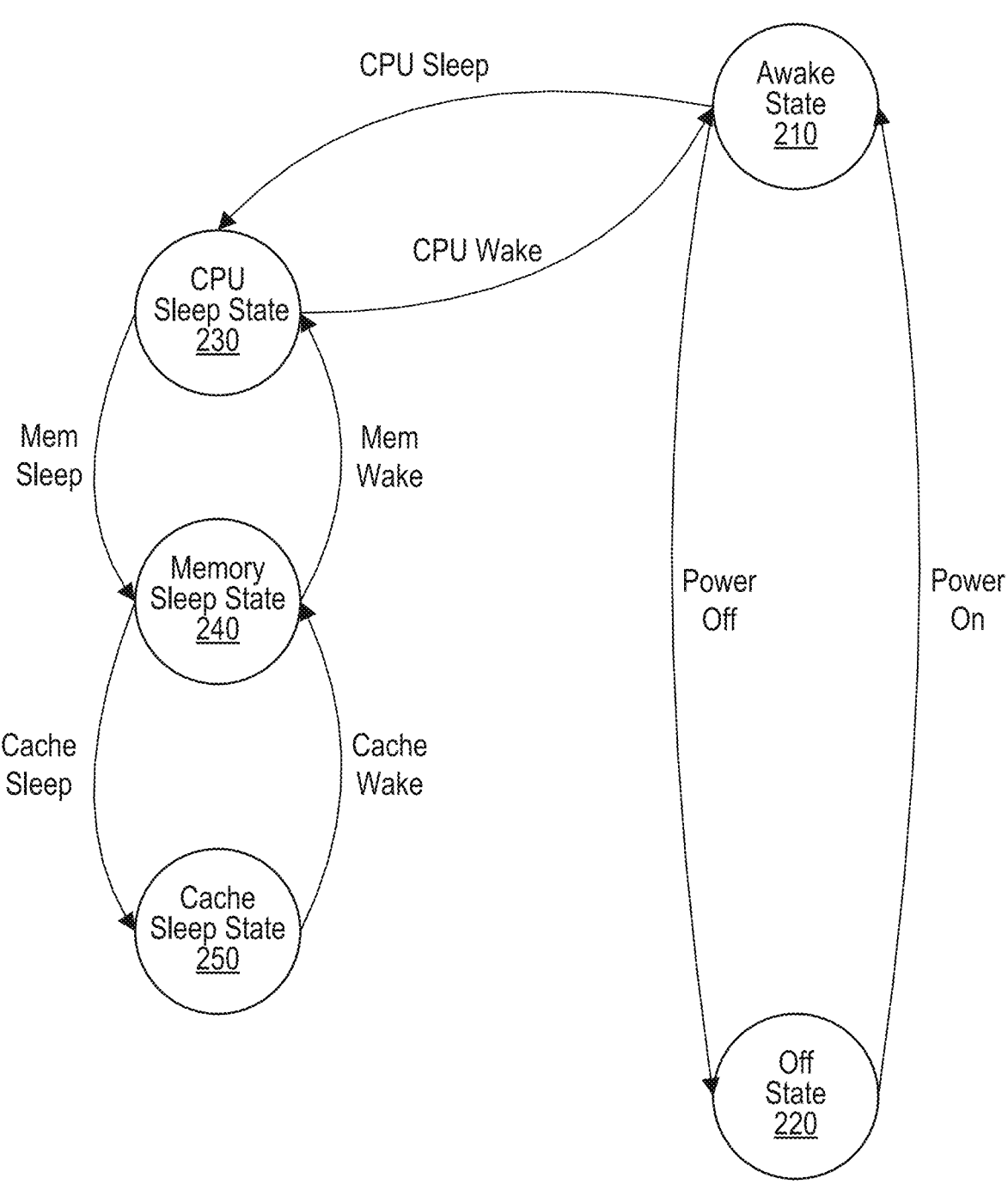
FIG. 2 is a block diagram illustrating elements of a state machine that comprises various performance states of an SOC that include a CPU sleep state, a memory sleep state, and a cache sleep state, according to some embodiments.

Turning now to FIG. 2, a block diagram of a state machine that comprises performance states employed by SOC 110 in one embodiment is shown. In the illustrated embodiment, the state machine includes an awake state 210, an off state 220, a CPU sleep state 230, a memory sleep state 240, and a cache sleep state 250. The vertical alignment of the states in FIG. 2 may be an indication of the relative power consumption at each state (not to scale). That is, awake state 210 may be the highest power-consuming state, CPU sleep state 230 may be lower power than awake state 210, memory sleep state 240 may be lower power than CPU sleep state 230, cache sleep state 250 may be lower power than memory sleep state 240, and off state 220 may be the lowest power state.

Each state of the state machine may be associated with at least a combination of power domains being powered on and/or components within a power domain being operable, and in some instances, a state may be associated with multiple combinations of power domains being powered on/operable components. As an example, awake state 210 may be associated with a power on state for at least one of the processors 145 and various combinations of the processors 145 being powered on may also be supported in awake state 210. Generally, a power state may include at least one combination of power domains powered on while other power domains are powered off and/or at least one combination of components with the power domains that are active and available for use.

In off state 220, in various embodiments, SOC 110 is entirely powered off, including AON component 170 and all power domains of SOC 110. Also, memory 112 may be powered off during off state 220. In response to a power on event in system 100 (e.g., a user pressing a power on button to start system 100), the state machine may transition to awake state 210 (the "power on" arc in FIG. 2). From awake state 210, the state machine may transition to off state 220 (the "power off" arc in FIG. 2) in response to certain event (e.g., the user pressing the power button for a sufficient period of time to cause system 100 to power down). Transitioning to off state 220 may be performed from awake state 210 to permit components (e.g., processors 145) of SOC 110 to save any desired information to permit recovery of the current state when system 100 is powered on again. But in some embodiments, there are power off arcs from other states 230, 240, and 250 to off state 220.

In awake state 210, in various embodiments, all the power domains are powered up and each component of SOC 110 may be operable. In some cases, a component may be clock gated, or even power gated, in awake state 210 if the component is not in use, but the component may come up from off state 220 in the active state. Processors 145 may boot the system, initializing components as desired, and may determine which components will remain powered on. During awake state 210, an idle processor 145 might be power gated to reduce the power consumption of SOC 110. From awake state 210, the state machine may transition to CPU sleep state 230. The transition from awake state 210 to CPU sleep state 230 may be performed when processors 145 are put in a sleep state (e.g. power gated-"CPU sleep" arc in FIG. 2).

In CPU sleep state 230, in various embodiments, SOC 110 is powered on but particular components (e.g., CPU complex 140) are powered off. Power domains 122, 132, and 173 can remain powered to permit AOP 174 and 176 to access memory 112 via memory controller 120. Other power domains may be powered such as a power domain having a display controller that can access memory 112 to display frames on a display associated with system 100. The power domain having CPU complex 140, however, is powered off in CPU sleep state 230, in various embodiments. In some embodiments, SOC PMGR 178 and/or peripherals 150 are powered off in CPU sleep state 230, while in other embodiments, SOC PMGR 178 and/or peripherals 150 remain powered in CPU sleep state 230.

Further, the state machine may transition from CPU sleep state 230 to awake state 210 responsive to an event that causes processors 145 to return to operation (or wake up)—shown as the "CPU wake" arc in FIG. 2. In some embodiments, there are CPU wake transitions from other sleep states 240 and 250, rather than transitioning through CPU sleep state 230. The state machine may also transition from CPU sleep state 230 to memory sleep state 240 in response to certain events. For example, a display controller may detect that the delay to the next frame is large enough to make transition to a lower power state worthwhile (e.g. the power saved will outweigh the power expended to shut down the display controller, power the display controller back up again, and restore state to the display controller). If such an event is detected, in various embodiments, the state machine transitions from CPU sleep state 230 to memory sleep state 240 as it may be beneficial to place memory 112 into a self-refresh mode (shown as the "mem sleep" arc) in which it internally generates refreshes to protect the contents that is stores.

In memory sleep state 240, in various embodiments, memory 112 is powered but placed into the self-refresh mode and power domains 132 and 173 are powered but power domain 122 and the power domain having CPU complex 140 are powered off. As such, memory controller 120 is powered off and memory 112 is inaccessible to components of SOC 110 during memory sleep state 240. Other power domains may be powered off, such as a power domain having the aforementioned display controller, the power domain(s) having peripheral(s) 150 (which may have already been powered off in CPU sleep state 230 in some embodiments), and the power domain having SOC PMGR 178 (which may have already been powered off in CPU sleep state 230 in some embodiments). Communications paths of communication fabric 190 that couple AON component 170 to memory cache 130 are powered in memory sleep state 240 in order to permit components (e.g., AOP 176) of AON component 170 to access memory cache 130, in various embodiments. As discussed in greater detail with respect to FIG. 3, data and instructions that may be used by the components of AON component 170 may be loaded from memory 112 into memory cache 130 as a part of the transition from CPU sleep state 230 into memory sleep state 240. As a result, AON component 170 may access the data and instructions from memory cache 130 while memory 112 is in the self-refresh mode.

The state machine may transition from memory sleep state 240 to CPU sleep state 230 responsive to an event that indicates that a component (e.g., a display controller) seeks to access memory 112. As a part of the transition from memory sleep state 240 to CPU sleep state 230, in various embodiments, memory 112 is restored to its previous operational state from the self-refresh mode (shown as the "mem wake" arc) and power domain 122 is receives power so that memory controller 120 resumes its normal operation. As a result, components of SOC 110 may access memory 112 again. The state machine may also transition from memory sleep state 240 to cache sleep state 250 in response to a detection that AOP 176 can be put to sleep (e.g., AOP 176 has finished processing the current available sensor data). In various embodiments, if such an event is detected, then the state machine transitions from memory sleep state 240 to cache sleep state 240 as it may be beneficial to power gate AOP 176 and place memory cache 130 in the retention mode (shown as the "cache sleep" arc) in which it retains cached data but is not accessible.

In cache sleep state 250, in various embodiments, all of SOC 110 is powered off except for AON component 170 and memory cache 130 is in the retention mode and memory 112 is in the self-refresh mode. Also, AOP 176 may be power gated but AOP 174 may remain active. In various embodiments, AOP 174 is configured to access the contents of a local memory (e.g., an SRAM) during memory sleep state 240 and cache sleep state 250—e.g., the AOP 174 may execute instructions from the local memory to manage any incoming sensor data from sensors 171 (which also may be stored in the local memory) during cache sleep state 250. In various embodiments, AOP 176 is configured to access data from memory cache 130 during memory sleep state 240 but not cache sleep state 250—AOP 176 may access data from memory 112 in awake state 210 and CPU sleep state 230. The state machine may transition to memory sleep state 230 from cache sleep state 250 responsive to a certain events. As an example, if enough sensor data has been collected during cache sleep state 250 for which it is desirable to restore AOP 176 to the active state to process it, then the state machine may transition back to memory sleep state 230 from cache sleep state 250. Since memory cache 130 retains cached data during cache sleep state 250, upon transitioning to memory sleep state 240, cached data may become available to AOP 176. This may be beneficial since SOC 110 does not have to be transitioned to a higher performance state than memory sleep state 240 from cache sleep state 250 for AOP 176 to be able to access its data and instructions.

Figure 3:
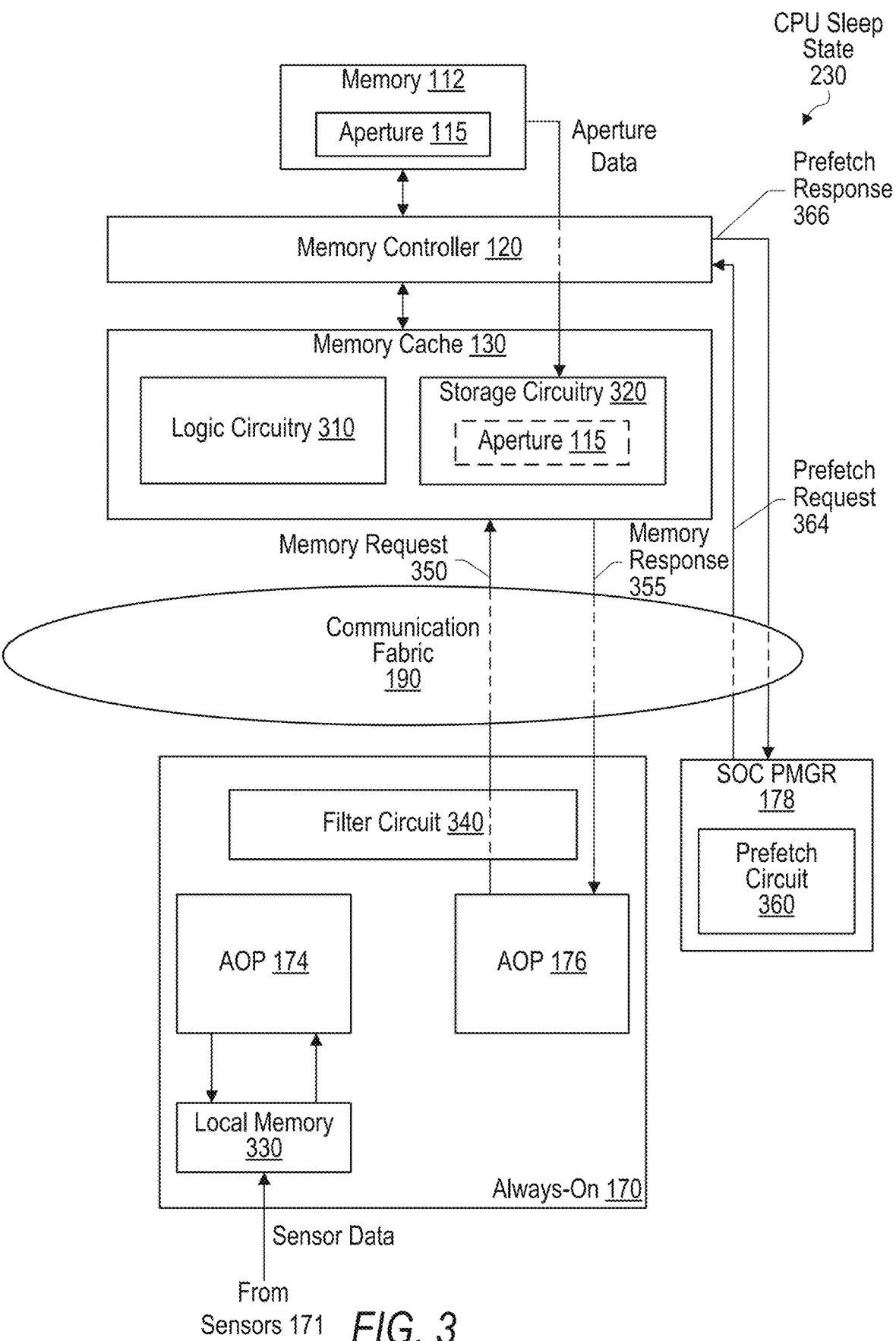
FIG. 3 is a block diagram illustrating elements of a CPU sleep state, according to some embodiments.

Turning now to FIG. 3, a block diagram of one embodiment of CPU sleep state 230 is shown. In the illustrated embodiment, there is memory 112, memory controller 120, memory cache 130, AON component 170, SOC PMGR 178, and communication fabric 190. As further shown, memory 112 includes aperture 115, memory cache 130 includes logic circuitry 310 and storage circuitry 320, AON component 170 includes AOP 174, AOP 176, a local memory 330, and a filter circuit 340, and SOC PMGR 178 includes a prefetch circuit 360.

As discussed, in various embodiments, during CPU sleep state 230, CPU complex 140 is powered off but memory 112, memory controller 120, memory cache 130, SOC PMGR 178, AON component 170, and at least a portion of communication fabric 190 for communication between those components remain powered on. As such, as shown, AOP 176 can issue memory requests 350 to memory cache 130 (and memory controller 120). For example, AOP 176 may execute a load instruction to load data from memory 112 and thus issue a memory request 350 in the form of a DRAM request to fetch the data. The data may not be stored in memory cache 130, and thus memory controller 120 may access the data from memory 112 and provide it to AOP 176 in a memory response 355, while storing it in memory cache 130. As such, memory requests 350 and memory responses 355 may be issued as a part of a transaction (e.g., a DRAM transaction) involving a memory request 350 (e.g., a DRAM request) and a memory response 355 (e.g., a DRAM response).

To prevent from AOP 176 from accessing a restricted memory space without approval, in various embodiments, AOP component 170 includes filter circuit 340. Filter circuit 340, in various embodiments, is circuitry configured to assess memory requests 350 from components (e.g., AOP 176) to determine whether those memory requests 350 address a memory address outside of the memory space(s) allocated to those components. As discussed, AOP 176 can be allocated a contiguous memory space (aperture 115) in memory 112, which may be fixed and provisioned at boot time. Since aperture 115 can be contiguous and fixed, filter circuit 340 may be programmed with a memory range corresponding to aperture 115—in some cases, aperture 115 is multiple separate address ranges and thus filter circuit 340 is programmed with multiple address ranges. When AOP 176 issues a memory request 350, in various embodiments, filter circuit 340 determines whether the address of that memory request 350 falls within the address range(s) stored by filter circuit 340. If the address is outside of the address range(s), then filter circuit 340 may prevent the memory request 350 from reaching the target component (e.g., by not forwarding the memory request 350), otherwise, filter circuit 340 may forward the memory request 350 if it falls within the address range(s) allocated to AOP 176. Filter circuit 340 may also perform filtering for AOP 174 and other components residing in AON component 170. In various embodiments, filter circuit 340 remains powered during various states (e.g., CPU sleep state 230, memory sleep state 240, and awake state 210) and thus can continue to prevent AOP 176 from accessing a restricted memory space without approval, even during low performance states such as memory sleep state 240.

If AOP 176 or another component (e.g., AOP 174) of AON component 170 wishes to access a memory address outside of their allocated memory space, then those components may issue a request to obtain permission to access that memory address. In various embodiments, the power management circuitry (PMGRs 178 and 179) is configured to manage a component's access to different memory addresses, and thus the permission request for permission may be sent to the power management circuitry. Consequently, if AOP 176 wishes to access DRAM addresses outside of aperture 115, then it may request permission from the power management circuitry. If the power management circuitry approves, then it may configure filter circuit 340 to permit AOP 176's memory request 350 to access the targeted address. In some cases, system 100 may be in a lower performance state (e.g., memory sleep state 240) in which memory 112 is in the self-refresh mode. If AOP 176 wishes to access DRAM addresses outside of aperture 115 and the power management circuitry approves, then the power management circuitry may transition system 100 to a higher performance state in which memory 112 is accessible so that AOP 176 can access the particular DRAM addresses outside of aperture 115. Thus, after AOP 176 receives permission, AOP 176 may send the memory request 350.

In various embodiments, the power management circuitry also controls access to AOP 176 by other components of system 100. If another component wishes to communicate with AOP 176, then the component may request permission from the power management circuitry. The power management circuitry may ensure that AOP 176 is active and not power gated prior to granting permission to the component. Once permission is granted, then the component may issue requests to AOP 176. The power management circuitry may further control access to other components (e.g., AOP 174) of AON component 170. In some embodiments, permission management is handled by a different component, such as filter circuit 340, memory controller 120, etc.

In various embodiments, memory cache 130 comprises logic circuitry 310 and storage circuitry 320. Storage circuitry 320 may be SRAM that can be used to store data from various components of system 100, including AOP 176. In various embodiments, storage circuitry 320 and local memory 330 share the same power rail powered directly by PMU 160. Accordingly, storage circuitry 320 may remain powered on (although in a retention state) during cache sleep state 250. As a result, storage circuitry 320 may retain the contents of aperture 115 even during cache sleep state 250 when the rest of memory cache 130 is powered off. Logic circuitry 310, in various embodiments, is circuitry that is configured to manage memory cache 130, including access to storage circuitry 320 and maintaining cache state information. Before system 100 is transitioned into cache sleep state 250, storage circuitry 320 may push cache state information into storage circuitry 320 so that it is preserved. Upon system 100 transitioning back to memory sleep state 240, storage circuitry 320 may restore the state of memory cache 130 based on that cache state information.

Also as shown, AOP 174 operates out of local memory 330. In various embodiments, local memory 330 is an SRAM memory that is used to store data and instructions that pertain to the operation of AOP 174. Accordingly, local memory 330 may store instructions executable by AOP 174 to perform various tasks that may include processing sensor data stored by sensors 171 in local memory 330. Local memory 330 may be powered in all performance states except off state 220, and thus AOP 174 may continue to operate as system 100 is transitioned between different performance states and into lower performance states.

When system 100 is being transitioned from CPU sleep state 230 to memory sleep state 240, the data and instructions that may be used by AOP 176 may be loaded into memory cache 130 so that AOP 176 can continue to operate out of its aperture 115. In various embodiments, prefetch circuit 360 of SOC PMGR 178 is configured to detect that system 100 is transitioning to memory sleep state 240 from CPU sleep state 230 and then prefetch the contents of AOP 176's aperture 115 from memory 112 into storage circuitry 320. Prefetch circuit 360 may start loading the contents of AOP 176's aperture 115 in response to detecting that all other components (e.g., CPU complex 140) having stopped to issue memory requests 350 for data from memory 112. To load the contents into storage circuitry 320, in various embodiments, prefetch circuit 360 issues a set of prefetch requests 364 that cause the contents of aperture 115 to be copied to memory cache 130. In various embodiments, these prefetch requests 364 are not speculative and system 100 is architected to ensure that they always succeed in fetching data into memory cache 130. Accordingly, memory controller 120 loads the contents of aperture 115 into memory cache 130 and returns a set of prefetch responses 366 acknowledging completion of the set of prefetch requests 364. In various embodiments, the prefetch responses 366 do not include the data that was loaded into storage circuitry 320, and thus may be different from memory responses 355 that can return requested data to a component (e.g., AOP 176) while also caching the returned data in storage circuitry 320. After aperture 115 has been loaded into memory cache 130, the power management circuitry may transition system 100 to memory sleep state 240.

In various embodiments, loading the contents of aperture 115 into memory cache 130 results in the eviction of content cached for other agents of SOC 110 (e.g., processors 145 of CPU complex 140). The allocation used by AOP 176 during memory sleep state 240 may be given back to those other SOC agents during higher performance states (e.g., active state 210). In some embodiments, there is no explicit copy back to memory 112 when leaving memory sleep state 240 since the data is just cached and naturally leaves memory cache 130 as it is evicted by other data. Furthermore, in various embodiments, AOP 176 (and/or AOP 174) can continue to access data during the higher performance states that may be resident in memory cache 130 or memory 112.

Figure 4:
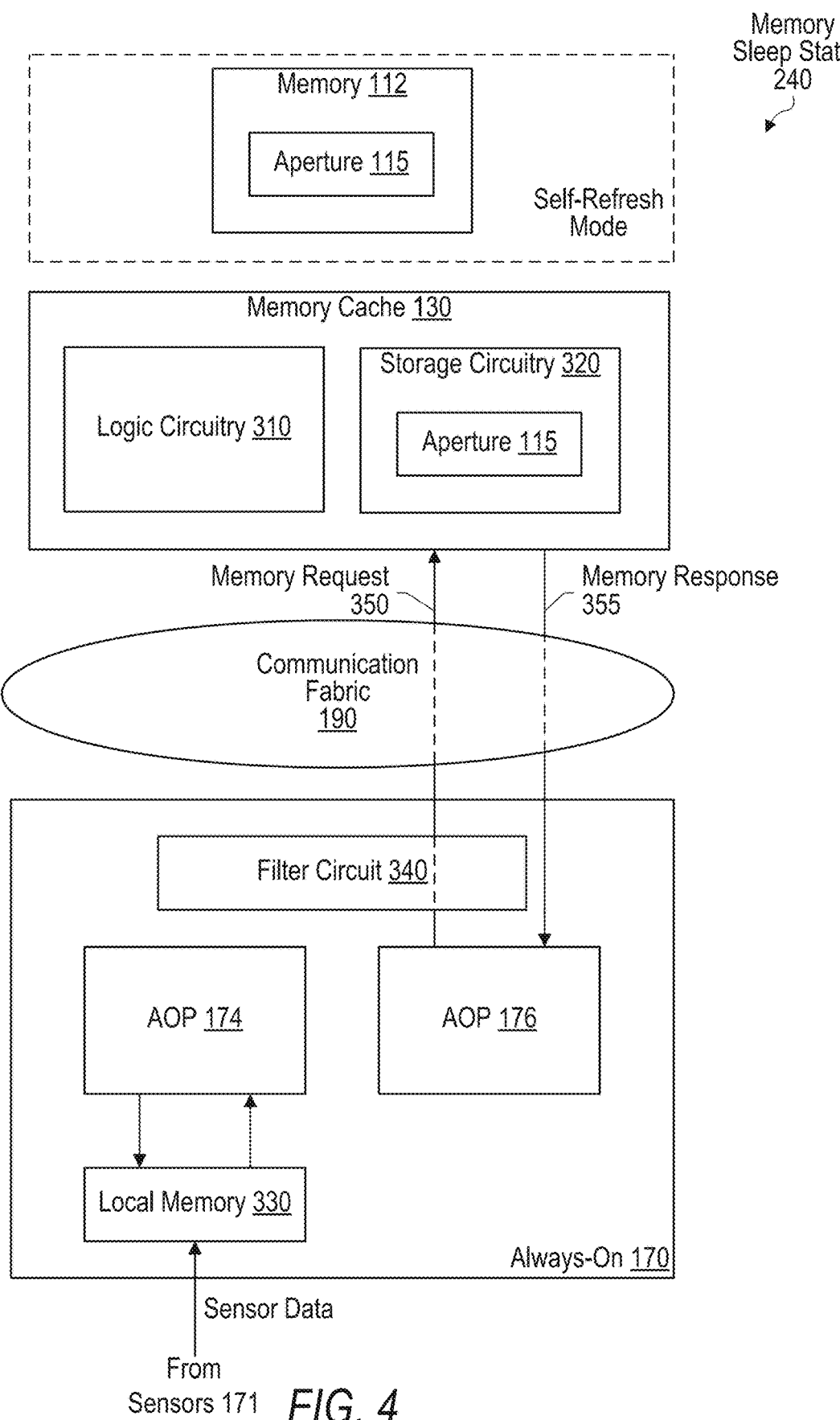
FIG. 4 is a block diagram illustrating elements of a memory sleep state, according to some embodiments.

Turning now to FIG. 4, a block diagram of one embodiment of memory sleep state 240 is shown. In the illustrated embodiment, there is memory 112, memory cache 130, AON component 170, and communication fabric 190. As further shown, memory 112 includes aperture 115, memory cache 130 includes logic circuitry 310 and storage circuitry 320, and AON component includes AOP 174, AOP 176, local memory 330, and filter circuit 340.

As discussed, in various embodiments, during memory sleep state 240, CPU complex 140 and memory controller 120 are powered off, memory 112 is in the self-fresh mode, and memory cache 130, AON component 170, and at least a portion of communication fabric 190 for communication between those components remain powered on. As shown, AOP 176 issues memory requests 350 to memory cache 130 and receives memory responses 355 from memory cache 130 during memory sleep state 240. As a result, AOP 176 can continue to operate from its aperture 115 during memory sleep state 240—that is, AOP 176 may continue to access data and instructions of its aperture 115 when memory 112 is inaccessible. In some instances, AOP 176 may issue a memory request 350 that results in a cache miss, e.g., because the entirety of aperture 115 may not have been loaded into memory cache 130, or it might be the result of an error. The power management circuitry may transition system 100 back to CPU sleep state 230 so that the cache miss can be resolved (e.g., by accessing the data from memory 112), and then the power management circuitry may transition system 100 to memory sleep state 240. When transitioning system 100 to cache sleep state 240, the power management circuitry may ensure that memory cache 130 is ready to be placed into the retention mode (e.g., memory cache 130 may provide an indication to the power management circuitry that it is ready for the transition) and then the power management circuitry may transition system 100 to cache sleep state 240. In some embodiments, the power management circuitry may also ensure that AOP 176 is ready as it may support retention, as discussed below.

To conserve additional power, in various embodiments, portions of memory cache 130 can be selectively powered down that are not used by AOP 176 during memory sleep state 240. As an example, storage circuitry 320 may comprise multiple storage arrays or regions that can be independently powered down. Accordingly, the storage arrays that do not store any of AOP 176's aperture 115 may be powered down during memory sleep state 240. Portions of memory cache 130 may also be powered down in other performance states (e.g., CPU sleep state 230). For example, the storage arrays of storage circuitry 320 that store data for processors 145 may be powered down during CPU sleep state 230. Also, power may be conserved when AOP 176 is not enabled in a product (e.g., during memory sleep state 240) because storage circuitry 320 can be powered down in various embodiments.

Figure 5:
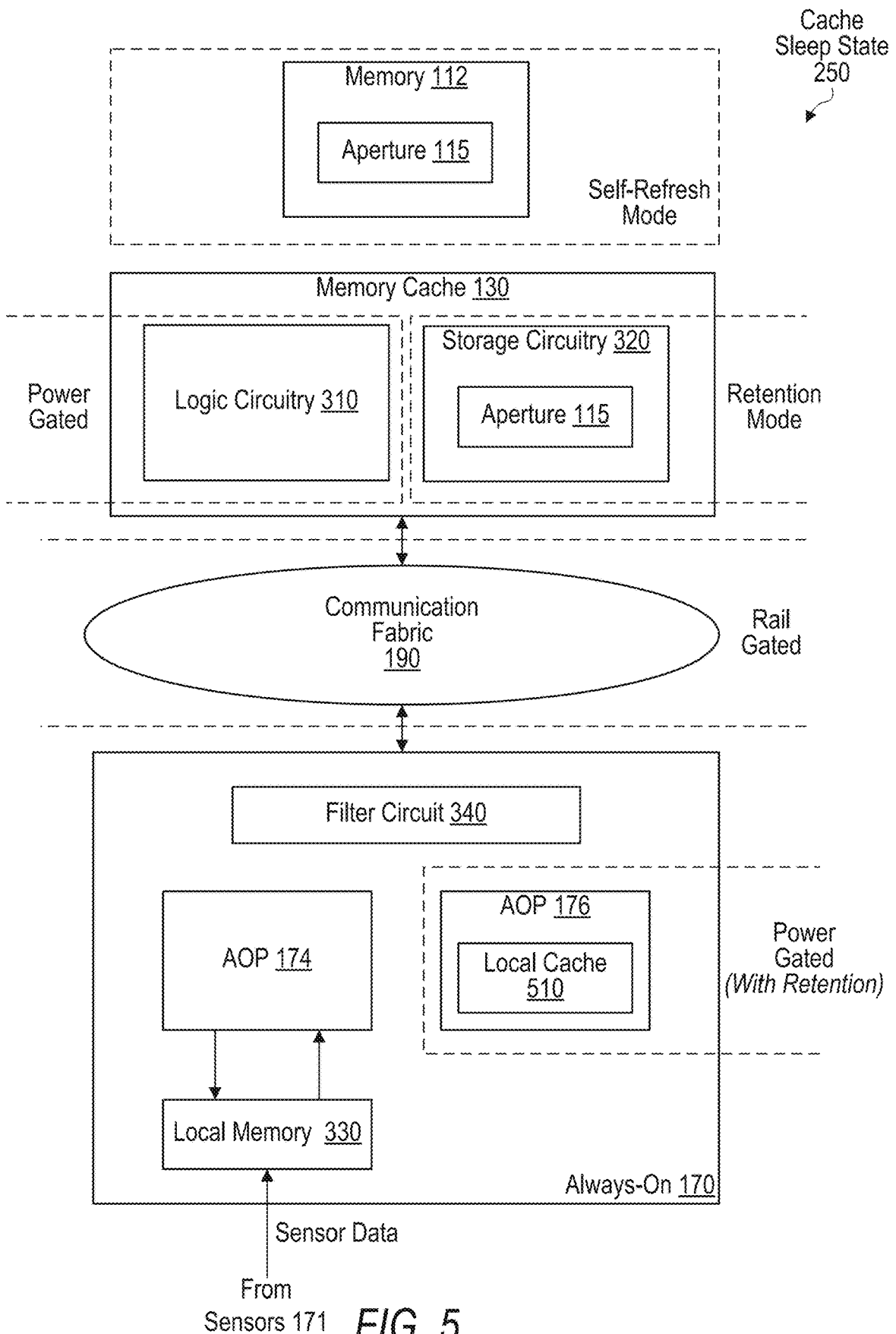
FIG. 5 is a block diagram illustrating elements of a cache sleep state, according to some embodiments.

Turning now to FIG. 5, a block diagram of one embodiment of cache sleep state 250 is shown. In the illustrated embodiment, there is memory 112, memory cache 130, AON component 170, and communication fabric 190. As further shown, memory 112 includes aperture 115, memory cache 130 includes logic circuitry 310 and storage circuitry 320, and AON component includes AOP 174, AOP 176, local memory 330, and filter circuit 340.

As discussed, in various embodiments, during cache sleep state 250, CPU complex 140, memory controller 120, and communication fabric 190 are powered off, memory 112 is the self-refresh mode and storage circuitry 320 of memory cache 130 is in the retention mode, and AON component 170 remains powered. Also, during cache sleep state 230, logic circuitry 310 and AOP 176 can be power gated. In some embodiments, AOP 176 supports architectural rendition. As such, during cache sleep state 250, AOP 176 may be power gated with retention such that data (e.g., state information) stored in a local cache 510 (e.g., an L2 cache) is retained. When system 100 is transitioned to memory state 240, AOP 176 may restore its state based on the data retained in local cache 510 and may begin to operate out of memory cache 130 as the data stored in memory cache 130 may be retained during cache sleep state 250. During cache sleep state 250, in various embodiments, AOP 174 can continue to operate out of local memory 330 and sensors 171 can continue to store sensor data in local memory 330.

Figure 6:
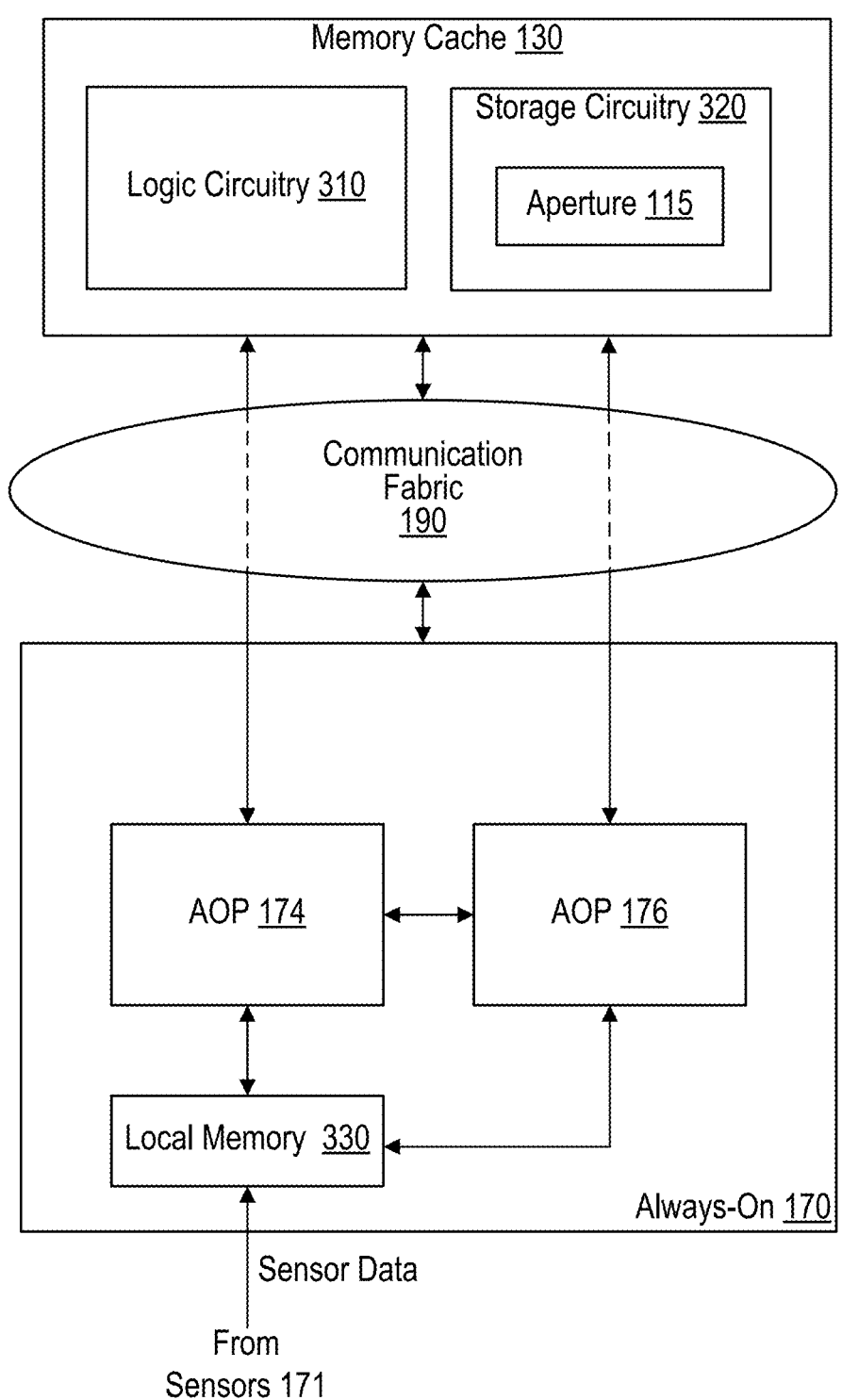
FIG. 6 is a block diagram illustrating multiple processors of an always-on component sharing resources, according to some embodiments.

Turning now to FIG. 6, a block diagram of one embodiment in which certain resources (e.g., local memory 330) are shared between AOP 174 and AOP 176 is shown. In the illustrated embodiment, there is memory cache 130 (with logic circuitry 310 and storage circuit 320 that stores contents of aperture 115), AON component 170 (with AOP 174, AOP 176, and memory 330), and communication fabric 190. In some embodiments, AOP 174 and 176 are configured to utilize each other's resources as part of their operation. Accordingly, AOP 176 may access local memory 330 in order to obtain data and instructions. For example, AOP 176 may access and execute instructions from memory cache 130 that implement an application that processes sensor data accessed from local memory 330. Likewise, AOP 174 may access memory cache 130 to store data (e.g., sensor data or results from the sensor data accessed from local memory 330). In some cases, AOP 174 may process sensor data from local memory 330 and provide a result of the processing to AOP 176, which may further process that result or store in memory cache 130. In various embodiments, the resources (e.g., local memory and memory cache 130) available to AOP 174 and 176 can depend on the performance state. As an example, AOP 176 may operate out of memory cache 130 in memory sleep state 240 and out of local memory 330 in cache sleep state 250 (if AOP 176 is not power gated in cache sleep state 250). Also, AOP 174 may operate out of memory cache 130 during the performance states (e.g., CPU sleep state 230, memory sleep state 240, etc.) in which memory cache 130 is available.

Turning now to FIG. 7, a flow diagram of a method 700 is depicted. Method 700 is one embodiment of a method performed by an integrated circuit (e.g., SOC 110) in order to reduce power consumption. Method 700 might include more or less steps than shown—e.g., a step in which the integrated circuit transitions from a lower performance state to a higher performance state.

Method 700 begins in step 710 with the integrated circuit determining to transition to a first performance state (e.g., memory sleep state 240) from a higher performance state (e.g., CPU sleep state 230). In various embodiments, the integrated circuit comprises component circuits (e.g., CPU complex 140, peripherals 150, AON component 170, etc.) configured to access data from a memory (e.g., memory

112). A particular component circuit (e.g., AON component 170) may include a local memory (e.g., local memory 330) and may be configured to remain powered on when remaining ones of the component circuits are powered off. The integrated circuit may include a memory controller circuit (e.g., memory controller 120) that is configured to interface to the memory on behalf of the component circuits. The memory controller circuit may store data accessed from the memory in a memory cache (e.g., memory cache 130) to service requests from the component circuits.

In step 720, the integrated circuit transitions to the first performance state in which the memory is in a self-refresh mode, the particular component circuit and the memory cache receive power, and the particular component circuit accesses data from the local memory and the memory cache. In various embodiments, the particular component circuit includes a first processor (e.g., AOP 176) that is configured to, during the first performance state, access data from the memory cache and a second processor (e.g., AOP 174) that is configured to, during the first performance state, access data from the local memory. The first processor may access data of the local memory and the second processor may access data of the memory cache when the integrated circuit is in the first performance state.

In various embodiments, the particular component circuit includes a security circuit (e.g., filter circuit 340) configured to, when the integrated circuit is in the first performance state, prevent the first processor from accessing data outside of a contiguous memory space (e.g., aperture 115) allocated to the particular component circuit. In response to a determination to send a memory request for particular data outside of the contiguous memory space allocated to the particular component circuit, the first processor may send a permission request to a power management circuit (e.g., SOC PMGR 178 and AON PMGR 179) for permission to access the particular data, and in response to determining that the power management circuit has granted the permission, send the memory request. In various embodiments, the power management circuit is configured to, when the integrated circuit is in the first performance state and in response to receiving the permission request, transition the integrated circuit from the first performance state back to the higher performance state.

In various embodiments, the integrated circuit includes a prefetch circuit (e.g., prefetch circuit 360) configured to, as a part of the transition to the first performance state from the higher performance state, load, into the memory cache, data from the contiguous memory space allocated in the memory to the particular component circuit. The prefetch circuit may load the data from the contiguous memory space in response to detecting that the first performance state is to be entered and that the component circuits have stopped issuing requests for data from the memory. To load the data from the contiguous memory space, the prefetch circuit may issue a set of memory requests (e.g., prefetch requests 364) to the memory controller circuit to load the data from the contiguous memory space of the memory into the memory cache. The memory controller circuit may provide, to the prefetch circuit, a set of responses (e.g., prefetch responses 366) that excludes the data from the contiguous memory space but indicates that the data from the contiguous memory space has been loaded into the memory cache. The prefetch circuit may be located within the power management circuit. The other component circuits may, before sending a particular request to the first processor, send a permission request to the power management circuit for permission to send the particular request to the first processor. The power management circuit may verify that the first processor is awake before granting permission to send the particular request to the first processor.

In step 730, the integrated circuit transitions to a second performance state (e.g., cache sleep state 250) in which the memory is in a self-refresh mode, the memory cache is in a retention mode, and the particular component circuit accesses data from the local memory. In various embodiments, the first processor of the particular component circuit is power gated in the second performance state, and the second processor accesses data from the local memory during the second performance state. As a part of a transition from the first performance state to the second performance state, the integrated circuit may reduce a power supply voltage to the memory cache from a first magnitude used during active access of the memory cache to a second magnitude that is sufficient to retain data in the memory cache without access. As a part of a transition from the second performance state to the first performance state, the integrated circuit may restore the power supply voltage to the first magnitude.

Turning now to FIG. 8, a flow diagram of a method 800 is depicted. Method 800 is one embodiment of a method performed by an integrated circuit (e.g., SOC 110) in order to reduce power consumption. Method 800 might include more or less steps than shown—e.g., a step in which the integrated circuit transitions from a lower performance state to a higher performance state.

Method 800 begins in step 810 with the integrated circuit powering, while in a first performance state (e.g., awake state 210), a plurality of component circuits (e.g., CPU complex 140, peripherals 150, AON component 170, and SOC PMGR 178) of the integrated circuit. The plurality of component circuits may be configured to access data from a memory (e.g., memory 112) via a memory controller circuit (e.g., memory controller 120) that is configured to store the data in a memory cache (e.g., memory cache 130). A particular component circuit (e.g., AON component 170) of the plurality of component circuits may include a local memory (e.g., local memory 330).

In step 820, the integrated circuit transitions to a second performance state (e.g., memory sleep state 240) in which the memory cache and the particular component circuit remain powered on while remaining ones of the plurality of component circuits are powered off. As part of the transitioning, in step 822, the integrated circuit loads, into the memory cache, data from a memory space (e.g., aperture 115) that is allocated in the memory to the particular component circuit. As part of the transitioning, in step 824, the integrated circuit transitions the memory into a self-refresh mode. While the integrated circuit is in the second performance state, in various embodiments, the particular component circuit accesses data from the local memory and the memory cache. The memory space may be a contagious space allocated during a boot process of a system (e.g., system 100) that includes the integrated circuit.

In step 830, the integrated circuit transitions to a third performance state (e.g., cache sleep state 250). As part of the transitioning, in step 832, the integrated circuit power gates a portion (e.g., AOP 176) of the particular component circuit. While the integrated circuit is in the third performance state, the particular component circuit may access data from the local memory but not the memory cache. As part of the transitioning, in step 834, the integrated circuit transitions the memory cache into a retention mode. In various embodiments, the particular component circuit includes a first processor (e.g., AOP 176) that accesses, during the second performance state, data from the memory cache, and a second processor (e.g., AOP 174) that accesses, during the second and third performance states, data from the local memory. The first processor may be power gated with retention during the third performance state to retain state information stored by the first processor. As part of transitioning the integrated circuit from the third performance state back to the second performance state, the integrated circuit may transition the memory cache from the retention mode to a prior state in which the first processor is permitted to access data of the memory cache that was retained during the third performance state.

Turning now to FIG. 9, a flow diagram of a method 900 is depicted. Method 900 is one embodiment of a method performed by a system (e.g., system 100) in order to reduce power consumption. Method 900 might include more or less steps than shown—e.g., a step in which the integrated circuit transitions from a lower performance state to a higher performance state.

In step 910, the system transitions an integrated circuit (e.g., SOC 110) of the system to a first performance state (e.g., memory sleep state 240) in which a memory (e.g., memory 112) is in a self-refresh mode, a particular component circuit (e.g., AON component 170) and a memory cache (e.g., memory cache 130) receive power, a first processor (e.g., AOP 176) of the particular component circuit accesses data from the memory cache and a second processor (e.g., AOP 174) of the particular component circuit accesses data from a local memory (e.g., local memory 330). In some embodiments, the first processor is configured to access data of the local memory and the second processor is configured to access data of the memory cache when the integrated circuit is in the first performance state. A power management circuit may load, into the memory cache from the memory and before the integrated circuit is transitioned into the first performance state from a higher performance state (e.g., CPU sleep state 230), data from a memory space (e.g., aperture 115) that is allocated to the first processor. In various embodiments, a portion of the power management circuit (e.g., AON PMGR 179) transitions the integrated circuit between performance states.

In step 920, the system transitions the integrated circuit to a second performance state (e.g., cache sleep state 250) in which the memory cache is in retention mode, the first processor is power gated, and the second processor accesses data from the local memory. In the first and second performance states, other components (e.g., memory controller 120 and a CPU complex 140) of the integrated circuit may be powered down.

Example Device

Figure 10:
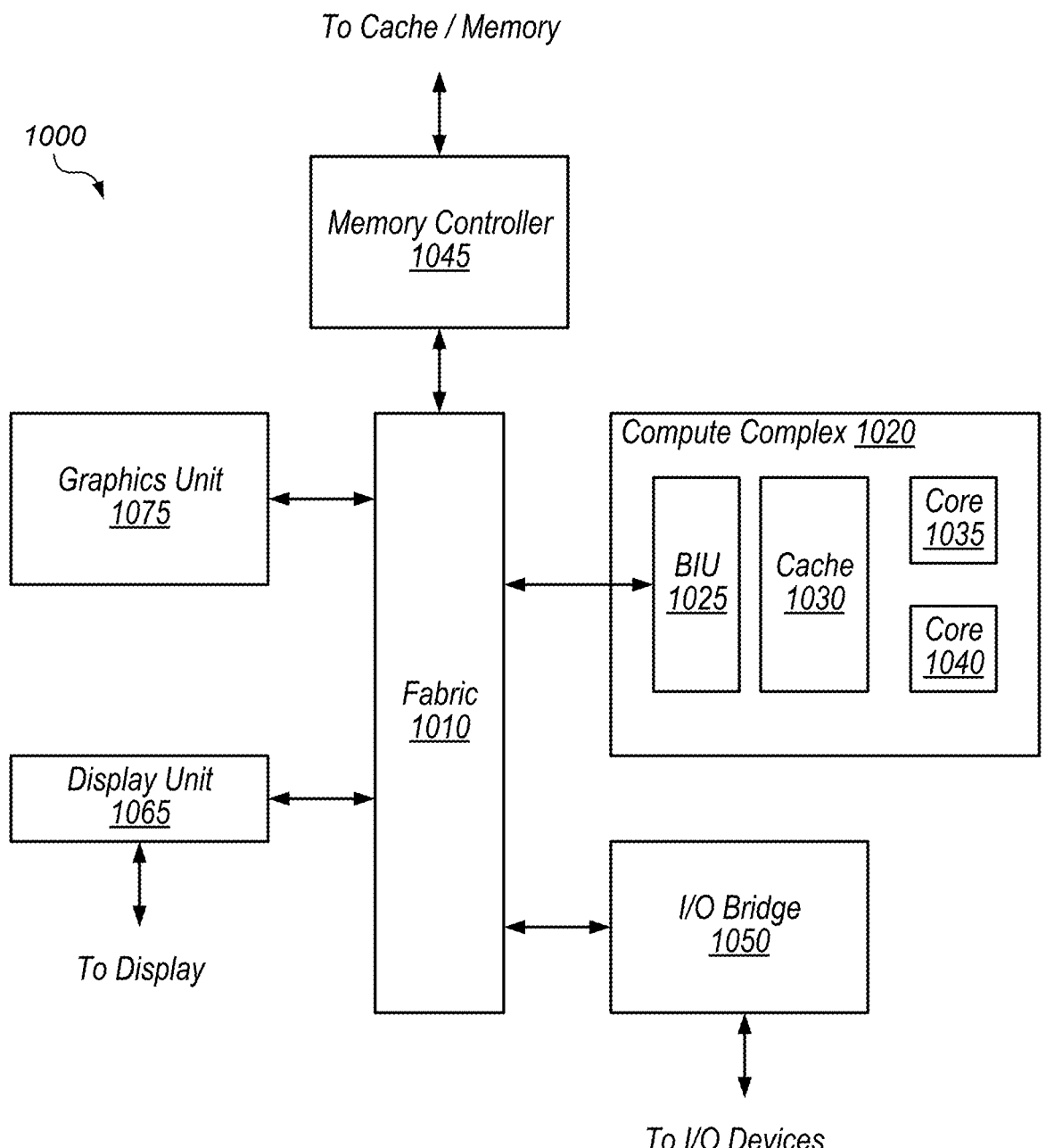
FIG. 10 is a block diagram illustrating elements of a device that implements components described in the present disclosure, according to some embodiments.

Referring now to FIG. 10, a block diagram illustrating an example embodiment of a device 1000 is shown. In various embodiments, device 1000 corresponds to system 100. Thus, elements of device 1000 may be included within a system on a chip. In some embodiments, device 1000 may be included in a mobile device, which may be battery-powered, and therefore power consumption may be an important design consideration. In the illustrated embodiment, device 1000 includes fabric 1010 (which can correspond to fabric 190), compute complex 1020 (which can correspond to CPU complex 140), input/output (I/O) bridge 1050, cache/memory controller 1045 (which can correspond to controller 120), graphics unit 1075, and display unit 1065. In some embodiments, device 1000 may include other components in addition to or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and caches. For example, compute complex 1020 may include 1, 2, or 4 processor cores, or any other suitable number. In one embodiment, cache 1030 is a set associative L2 cache. In some embodiments, cores 1035 and 1040 may include internal instruction and data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions. These instructions may be stored in computer readable medium such as a memory coupled to memory controller 1045 discussed below.

As used herein, the term "coupled to" may indicate one or more connections between elements, and a coupling may include intervening elements. For example, in FIG. 10, graphics unit 1075 may be described as "coupled to" a memory through fabric 1010 and cache/memory controller 1045. In contrast, in the illustrated embodiment of FIG. 10, graphics unit 1075 is "directly coupled" to fabric 1010 because there are no intervening elements.

Cache/memory controller 1045 may be configured to manage transfer of data between fabric 1010 and one or more caches and memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches. Memory coupled to controller 1045 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1045 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1020 to cause the computing device to perform functionality described herein.

Graphics unit 1075 may include one or more processors, e.g., one or more graphics processing units (GPUs). Graphics unit 1075 may receive graphics-oriented instructions, such as OPENGL®, Metal®, or DIRECT3D® instructions, for example. Graphics unit 1075 may execute specialized GPU instructions or perform other operations based on the received graphics-oriented instructions. Graphics unit 1075 may generally be configured to process large blocks of data in parallel and may build images in a frame buffer for output to a display, which may be included in the device or may be a separate device. Graphics unit 1075 may include transform, lighting, triangle, and rendering engines in one or more graphics processing pipelines. Graphics unit 1075 may output pixel information for display images. Graphics unit 1075, in various embodiments, may include programmable shader circuitry which may include highly parallel execution cores configured to execute graphics programs, which may include pixel tasks, vertex tasks, and compute tasks (which may or may not be graphics-related).

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and low-power always-on functionality, for example. I/O bridge 1050 may also include interfaces such as pulse-width modulation (PWM), general-purpose input/output (GPIO), serial peripheral interface (SPI), and inter-integrated circuit (I2C), for example. Various types of peripherals and devices may be coupled to device 1000 via I/O bridge 1050.

In some embodiments, device 1000 includes network interface circuitry (not explicitly shown), which may be connected to fabric 1010 or I/O bridge 1050. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1000 with connectivity to various types of other devices and networks.

Example Applications

Figure 11:
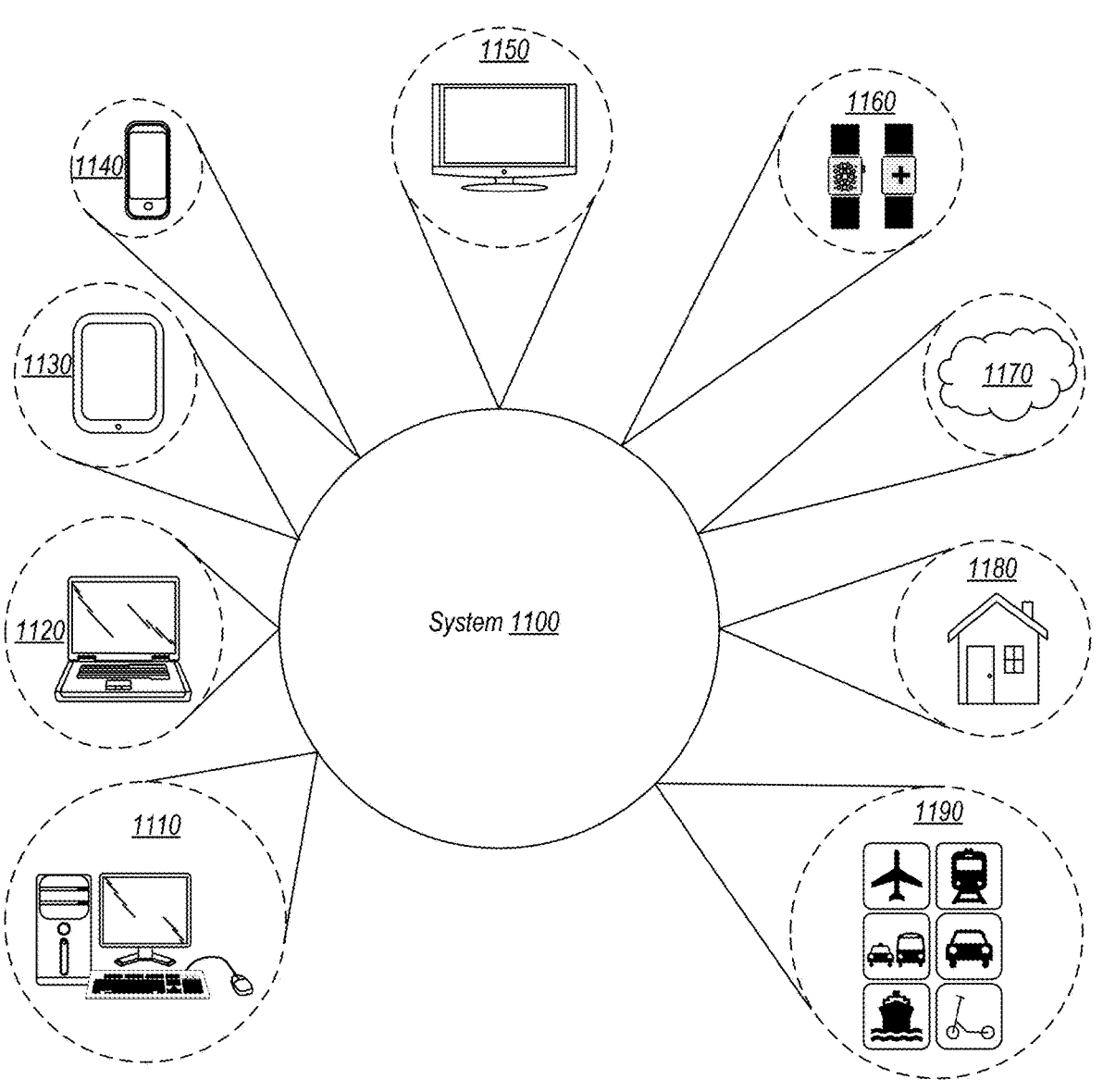
FIG. 11 is a block diagram illustrating an example of a system used in various types of applications, according to some embodiments.

Turning now to FIG. 11, various types of systems that may include any of the circuits, devices, or system discussed above. System or device 1100, which may incorporate or otherwise utilize one or more of the techniques described herein (e.g., system or device 1100 may correspond to system 100), may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 12:
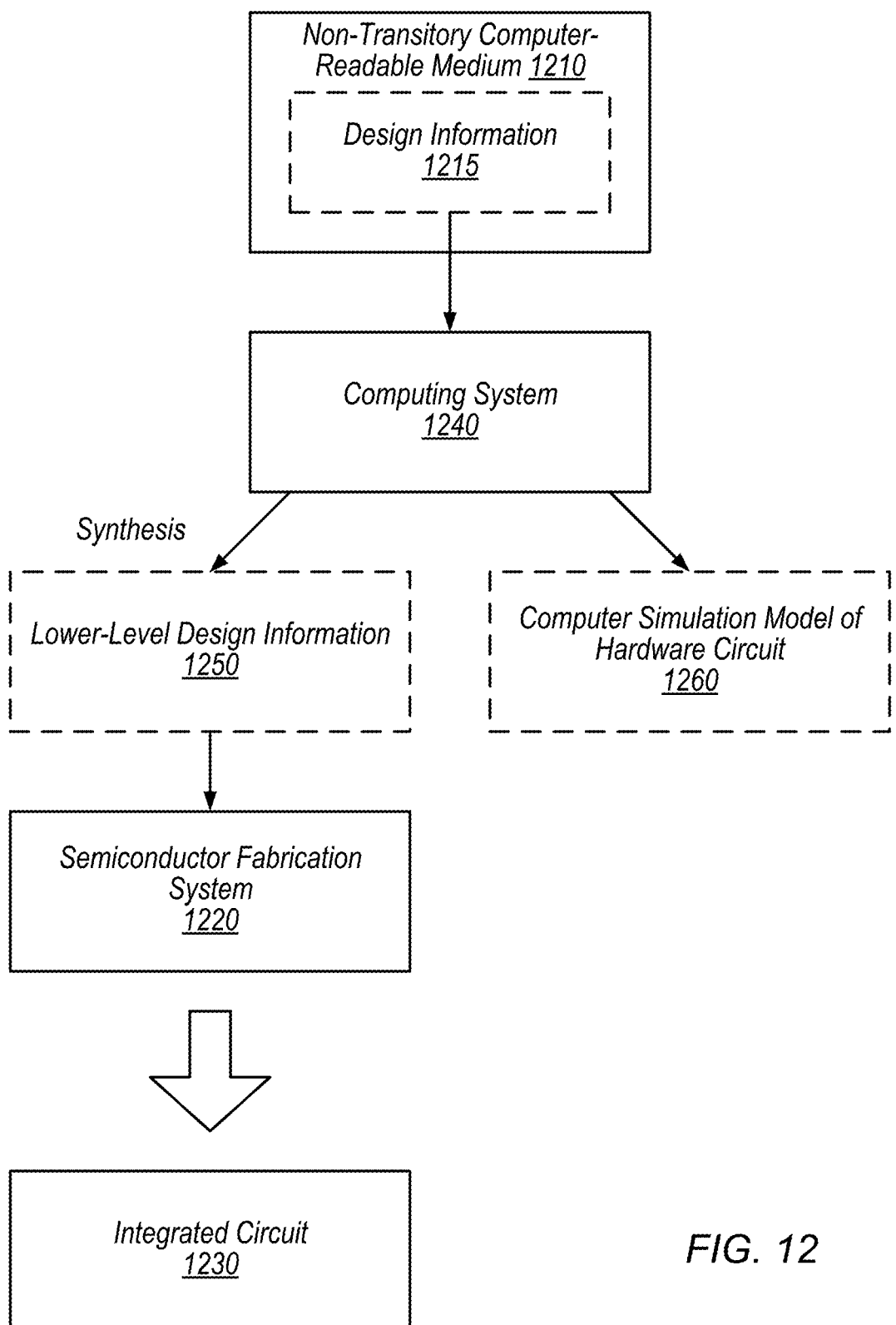
FIG. 12 is a block diagram illustrating an example process of fabricating an integrated circuit, according to some embodiments.

FIG. 12 is a block diagram illustrating an example non-transitory computer-readable storage medium that stores circuit design information, according to some embodiments. In the illustrated embodiment, computing system 1240 is configured to process the design information. This may include executing instructions included in the design information, interpreting instructions included in the design information, compiling, transforming, or otherwise updating the design information, etc. Therefore, the design information controls computing system 1240 (e.g., by programming computing system 1240) to perform various operations discussed below, in some embodiments.

In the illustrated example, computing system 1240 processes the design information to generate both a computer simulation model of a hardware circuit 1260 and lower-level design information 1250. In other embodiments, computing system 1240 may generate only one of these outputs, may generate other outputs based on the design information, or both. Regarding the computing simulation, computing system 1240 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1240 also processes the design information to generate lower-level design information 1250 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1250 (potentially among other inputs), semiconductor fabrication system 1220 is configured to fabricate an integrated circuit 1230 (which may correspond to functionality of the simulation model 1260). Note that computing system 1240 may generate different simulation models based on design information at various levels of description, including information 1250, 1215, and so on. The data representing design information 1250 and model 1260 may be stored on medium 1210 or on one or more other media.

In some embodiments, the lower-level design information 1250 controls (e.g., programs) the semiconductor fabrication system 1220 to fabricate the integrated circuit 1230. Thus, when processed by the fabrication system, the design information may program the fabrication system to fabricate a circuit that includes various circuitry disclosed herein.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Accordingly, non-transitory computer-readable storage medium 1210 may include two or more memory media; such media may reside in different locations—for example, in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1240, semiconductor fabrication system 1220, or both. In some embodiments, design information may also include one or more cell libraries that specify the synthesis, layout, or both of integrated circuit 1230. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1230 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 and model 1260 are configured to operate according to a circuit design specified by design information 1215, which may include performing any of the functionality described herein. For example, integrated circuit 1230 may include any of various elements shown in FIGS. 1A-6. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1220 to fabricate integrated circuit 1230.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An integrated circuit, comprising:

a plurality of component circuits configured to access data from a memory, wherein a particular component circuit of the plurality of component circuits includes a local memory, and wherein the particular component circuit is configured to remain powered on when remaining ones of the plurality of component circuits are powered off;

a memory controller circuit that is configured to interface to the memory on behalf of the plurality of component circuits, wherein the memory controller circuit is configured to store data from the memory in a memory cache to service requests from the plurality of component circuits; and a power management circuit that is configured to transition the integrated circuit between a plurality of different performance states that includes:

a first performance state in which:

the memory is in a self-refresh mode;

the particular component circuit and the memory cache receive power; and the particular component circuit is configured to access data from the local memory and the memory cache; and a second performance state in which:

the memory cache is in a retention mode; and the particular component circuit is configured to access data from the local memory.

2. The integrated circuit of claim 1, wherein the particular component circuit includes:

a first processor that is configured to, during the first performance state, access data from the memory cache, wherein the first processor is power gated in the second performance state; and a second processor that is configured to, during the first and second performance states, access data from the local memory.

3. The integrated circuit of claim 2, wherein the first processor is configured to access data of the local memory and the second processor is configured to access data of the memory cache when the integrated circuit is in the first performance state.

4. The integrated circuit of claim 2, wherein ones of the plurality of component circuits are configured to, before sending a particular request to the first processor, send a permission request to the power management circuit for permission to send the particular request to the first processor, and wherein the power management circuit is configured to verify that the first processor is awake before granting permission to send the particular request to the first processor.

5. The integrated circuit of claim 1, further comprising:

a prefetch circuit configured to, as part of a transition to the first performance state from a higher performance state than the first performance state, load, into the memory cache, data from a contiguous memory space allocated in the memory to the particular component circuit.

6. The integrated circuit of claim 5, wherein the prefetch circuit is configured to load the data from the contiguous memory space in response to a detection that the first performance state is to be entered and that the plurality of component circuits have stopped issuing requests for data from the memory.

7. The integrated circuit of claim 5, wherein the prefetch circuit is located within the power management circuit.

8. The integrated circuit of claim 5, wherein to load the data from the contiguous memory space, the prefetch circuit is configured to issue a set of memory requests to the memory controller circuit to load the data from the contiguous memory space of the memory into the memory cache, and wherein the memory controller circuit is configured to provide, to the prefetch circuit, a set of responses that excludes the data from the contiguous memory space but indicates that the data from the contiguous memory space has been loaded into the memory cache.

9. The integrated circuit of claim 1, wherein the power management circuit is configured to:

as part of a transition from the first performance state to the second performance state, reduce a power supply voltage to the memory cache from a first magnitude used during active access of the memory cache to a second magnitude that is sufficient to retain data in the memory cache without access; and as part of a transition from the second performance state to the first performance state, restore the power supply voltage to the first magnitude.

10. The integrated circuit of claim 1, further comprising:

a security circuit configured to, when the integrated circuit is in the first performance state, prevent the particular component circuit from accessing data that resides outside of a contiguous memory space allocated to the particular component circuit.

11. The integrated circuit of claim 1, wherein the particular component circuit is configured to:

in response to a determination to send a memory request for particular data residing outside of a contiguous memory space allocated to the particular component circuit, send a permission request to the power management circuit for permission to access the particular data; and send the memory request in response to a determination that the power management circuit has granted the permission.

12. The integrated circuit of claim 11, wherein the power management circuit is configured to, when the integrated circuit is in the first performance state and in response to a reception of the permission request, transition the integrated circuit from the first performance state to a higher performance state than the first performance state.

13. A method, comprising:

powering, while an integrated circuit is in a first performance state, a plurality of component circuits of the integrated circuit, wherein the plurality of component circuits is configured to access data from a memory via a memory controller circuit configured to store the data in a memory cache, and wherein a particular component circuit of the plurality of component circuits includes a local memory;

transitioning the integrated circuit to a second performance state in which the memory cache and the particular component circuit remain powered on while remaining ones of the plurality of component circuits are powered off, and wherein the transitioning includes:

loading, into the memory cache, data from a memory space allocated in the memory to the particular component circuit, wherein, while the integrated circuit is in the second performance state, the particular component circuit accesses data from the local memory and the memory cache; and transitioning the memory into a self-refresh mode; and transitioning the integrated circuit to a third performance state, wherein the transitioning to the third performance state includes:

power gating a portion of the particular component circuit, wherein, while the integrated circuit is in the third performance state, the particular component circuit accesses data from the local memory; and transitioning the memory cache into a retention mode.

14. The method of claim 13, wherein the particular component circuit includes:

a first processor that accesses, during the second performance state, data from the memory cache; and a second processor that accesses, during the second and third performance states, data from the local memory.

15. The method of claim 14, further comprising:

as part of transitioning the integrated circuit from the third performance state to the second performance state, transitioning the memory cache from the retention mode to a prior state in which the first processor is permitted to access data of the memory cache that was retained during the third performance state.

16. The method of claim 14, wherein the first processor is power gated with retention during the third performance state to retain state information stored by the first processor.

17. The method of claim 13, wherein the memory space is a contagious space allocated during a boot process of a system that includes the integrated circuit.

18. A non-transitory computer-readable medium having stored thereon design information that specifies a circuit design in a format recognizable by a fabrication system that is configured to use the design information to fabricate a hardware integrated circuit that comprises:

a plurality of component circuits configured to access data from a memory, wherein a particular component circuit of the plurality of component circuits is configured to remain powered on when remaining ones of the plurality of component circuits are powered off;

a memory controller circuit that is configured to interface to the memory on behalf of the plurality of component circuits, wherein the memory controller circuit is configured to store data from the memory in a memory cache to service requests from the plurality of component circuits;

a power management circuit that is configured to transition the hardware integrated circuit between a plurality of different performance states that includes:

a first performance state in which:

the memory is in a self-refresh mode;

the particular component circuit and the memory cache receive power;

a first processor of the particular component circuit is configured to access data from the memory cache; and a second processor of the particular component circuit is configured to access data from a local memory of the particular component circuit; and a second performance state in which:

the memory is in a self-refresh mode;

the first processor is power gated and the memory cache is in a retention mode; and the second processor is configured to access data from the local memory.

19. The non-transitory computer-readable medium of claim 18, wherein the first processor is configured to access data of the local memory and the second processor is configured to access data of the memory cache when the hardware integrated circuit is in the first performance state.

20. The non-transitory computer-readable medium of claim 18, wherein the power management circuit is configured to load, into the memory cache from the memory and before transitioning the hardware integrated circuit into the first performance state from a higher performance state, data from a memory space allocated to the first processor.

* * * * *